(12) United States Patent
Reial et al.

(10) Patent No.: US 10,448,355 B2
(45) Date of Patent: Oct. 15, 2019

(54) RADIO LOCATION TECHNIQUE

(71) Applicant: Telefonaktiebolaget LM Ericsson (publ), Stockholm (SE)

(72) Inventors: Andres Reial, Malmö (SE); Fredrik Nordström, Lund (SE); Magnus Åström, Lund (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/766,273

(22) PCT Filed: Mar. 6, 2018

(86) PCT No.: PCT/EP2018/055491
§ 371 (c)(1),
(2) Date: Apr. 5, 2018

(65) Prior Publication Data
US 2019/0281574 A1    Sep. 12, 2019

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0036* (2013.01); *G01S 5/10* (2013.01);
(Continued)

(58) Field of Classification Search
CPC .................................................. H04W 64/003
See application file for complete search history.

(56) References Cited

U.S. PATENT DOCUMENTS

2004/0127163 A1* 7/2004 Schramm .............. H04W 36/20
455/67.11
2013/0171995 A1* 7/2013 Fujishiro ............... H04W 28/08
455/441
(Continued)

FOREIGN PATENT DOCUMENTS

CN        106341882 A      1/2017
WO     2016122761 A1      8/2016
(Continued)

OTHER PUBLICATIONS

Invitation to Pay Additional Fees and Where Applicable, Protest Fee, dated Nov. 27, 2018, issued in corresponding PCT Application PCT/EP2018/055491, consisting of 12-pages.
(Continued)

*Primary Examiner* — Justin Y Lee
(74) *Attorney, Agent, or Firm* — Christopher & Weisberg, PA

(57) ABSTRACT

A technique for locating a radio device within a region covered by a radio access network, RAN is described. The RAN includes a plurality of transmission and reception points, TRPs. As to a method aspect of the technique, reports indicative of measurements performed by the radio device based on radio beams transmitted from different TRPs of the RAN are received. Each of the radio beams correspond to a radio propagation direction from the respective TRP. The radio device is located based on a combination of the radio propagation directions corresponding to radio beams transmitted from at least two of the TRPs of the RAN.

24 Claims, 11 Drawing Sheets

(51) Int. Cl.
*G01S 5/00* (2006.01)
*G01S 5/10* (2006.01)
*H04B 7/0456* (2017.01)
*G01S 11/06* (2006.01)
*H04B 17/318* (2015.01)
*H04W 24/10* (2009.01)
*G01S 11/04* (2006.01)

(52) U.S. Cl.
CPC ............... *G01S 11/04* (2013.01); *G01S 11/06* (2013.01); *H04B 7/0456* (2013.01); *H04B 17/318* (2015.01); *H04W 24/10* (2013.01)

(56) References Cited

U.S. PATENT DOCUMENTS

2015/0133173 A1* 5/2015 Edge .................. G01S 1/66 455/456.6
2016/0195603 A1 7/2016 Li
2016/0295366 A1* 10/2016 Priyanto .............. H04B 7/0413

FOREIGN PATENT DOCUMENTS

WO 2017164925 A1 9/2017
WO 2018002154 A1 1/2018

OTHER PUBLICATIONS

Kaaranen et al. Title: UMTS Networks; Architecture, Mobility and Services; Second Edition; pp. 231-232, John Wiley & Sons, Ltd, West Sussex, England. Jun. 2005, consisting of 5-pages.

Kurras et al. Title: Direction of Arrival Based Positioning in Three Dimensional Coordinates, WSA 2017; Location and Date: Berlin, Germany Mar. 15-17, 2017, consisting of 7-pages.

Celik et al. Title: A Novel RSRP-Based E-CID Positioning for LTE Networks, Published in: Wireless Communications and Mobile Computing Conference (IWCMC), 2017 13th International, Location and Date: Valencia, Spain Jun. 26-30, 2017, consisting of 4-pages.

Kotaru et al. Title: SpotFi: Decimeter Level Localization Using WiFi; pp. 269-282; Location and Date: London, United Kingdom Aug. 17-21, 2015, consisting of 14-pages.

Sabharwal; Title: SpotFi: Decimeter Level Localization Using WiFi—Public Review; Department of Electrical and Computer Engineering; Rice University, Houston, TX; ashu@rice.edu.

* cited by examiner

RADIO LOCATION TECHNIQUE

CROSS-REFERENCE TO RELATED APPLICATIONS

This application is a Submission Under 35 U.S.C. § 371 for U.S. National Stage Patent Application of International Application Number: PCT/EP2018/055491, filed Mar. 6, 2018 entitled "RADIO LOCATION TECHNIQUE," the entirety of which is incorporated herein by reference.

TECHNICAL FIELD

The present disclosure generally relates to a technique for locating a radio device. More specifically, a method and a device are provided for locating a radio device in a radio access network.

BACKGROUND

Locating a radio device such as a user equipment (UE) is important inter alia for emergency services, cargo tracking, theft protection as well as services using the location as a service parameter or context dependency, such as search engines, speech recognition and augmented reality. Furthermore, some jurisdictions require mobile operators to locate emergency callers. Such services are collectively referred to as location-based services (LBS).

Since reliability and locating accuracy determine rescue success, it is desirable to seamlessly integrate the locating technique into radio access networks (RANs). In existing cellular RANs implementing the Universal Mobile Telecommunications System (UMTS) or Long Term Evolution (LTE) according to the Third Generation Partnership Project (3GPP), two or more transmission and reception points (TRPs) such as base stations are within range of radio communication relative to the radio device.

However, a conventional technique for locating the radio device is based on distance estimates, which is suboptimal in some respects. Firstly, the conventional locating technique is very susceptible to errors in the estimated distance between the radio device and the respective TRP. Secondly, the radio device has to perform additional procedures, such as a random access (RA) procedure towards multiple TRPs for estimating a timing advance (TA) or measuring and reporting of positioning reference signals (PRSs), causing an overhead over baseline active mode signaling and radio device operation. For example, the distances are estimated based on the time difference of arrival (TDOA) in RANs using Wideband Code Division Multiple Access (WCDMA). The TDOA of signals from multiple TRPs is analyzed by the radio device and the TDOA is reported to the RAN, as described in the book "UMTS networks: Architecture, mobility and services", Wiley, 2005, 2nd ed., p. 231. In LTE, the radio device measures and reports the TDOA of PRSs.

An alternative conventional locating technique estimates angles for geographical position estimation in order to not rely on accurate distance estimates. For example, the radio device estimates an angle of arrival (AOA) of signals from multiple TRPs (loc. cit., p. 232). The document "SpotFi: Decimeter Level Localization Using WiFi" by M. Kotaru, K. Joshi, D. Bharadia and S. Katti, Proceedings of the SIGCOMM 2015, ACM Conference on Special Interest Group on Data Communication, pp. 269-282, describes an implementation of "SpotFi", which is an indoor localization system deployable on commodity Wi-Fi infrastructure without hardware or firmware changes as an example of a non-cellular RAN. "SpotFi" incorporates algorithms that compute the AoA of multipath components at a Wi-Fi access point (AP) as an example for a TRP. In order to detect multipath propagation, the AoA of the direct path between the radio device and the TRP is identified at the TRP by receiving multiple subcarriers.

However, conventional techniques such as SpotFi require the radio device to transmit signals to a plurality of TRPs, and each of the TRPs is required to receive the signals and estimate the AoA based on the received signals over multiple subcarriers. Hence, the conventional techniques occupy radio resources of the RAN in space and frequency at a plurality of TRPs for locating a single radio device.

SUMMARY

Accordingly, there is a need for a location technique that does not rely on dedicated positioning measurements performed by TRPs or performed and reported by a radio device to be located. Alternatively or in addition, there is a need for a radio location technique that uses radio resources more efficiently and/or is compatible with frequency reuse on the level of radio devices.

As to a method aspect, a method of locating a radio device within a region covered by a radio access network (RAN) is provided. The RAN comprises a plurality of transmission and reception points (TRPs). The method may comprise or initiate a step of receiving reports indicative of measurements performed by the radio device based on radio beams transmitted from different TRPs of the RAN. Each of the radio beams may correspond to a radio propagation direction from the respective TRP. The method may further comprise or initiate a step of locating the radio device based on a combination of the radio propagation directions corresponding to radio beams transmitted from at least two of the TRPs of the RAN.

The measurements performed at the radio device to be located can be indicative of a spatial selectivity of the radio propagation direction so that at least some embodiments can accurately locate the radio device, e.g., more accurately than a locating technique based on directional measurements at the TRPs. Since the measurements are based on the radio beams transmitted from the different TRPs of the RAN, the RAN does preferably not have to measure the radio propagation directions in same or further embodiments. For example, the RAN can define, control or derive the radio propagation directions used for the location. More specifically, the radio propagation directions may be precisely known at the RAN when the radio propagation directions are combined for the locating.

Herein, "locating the radio device" may encompass determining a location of the radio device, e.g., within the region covered by the RAN. Alternatively or in addition, the radio device may be located by determining an area within the region covered by the RAN. Each of the TRPs may provide radio access in one or more cells of the RAN. The area may be smaller than a cell of the RAN.

The RAN may be a cellular network or a stand-alone network, e.g., according to the Third Generation Partnership Project (3GPP) or Wi-Fi according to the standard family IEEE 802.11. The radio device may be a mobile radio device, e.g., 3GPP user equipment (UE) or Wi-Fi station (STA).

The method may be performed at the RAN and/or by one or more of the TRPs, e.g., by a serving TRP. The radio device may be wirelessly connected (e.g., according to a radio resource control, RRC, state) with at least one of the TRPs (which may be referred to as the serving TRP) and/or using at least one of the radio beams (which may be referred to as a serving radio beam).

In a first variant, the reports (or at least one of the reports) may be directly received from the radio device at the serving TRP. In a second variant, which may be combinable with the first variant, the reports (or at least one of the reports) may be forwarded to the serving TRP. For example, each of the reports is received by the respective TRP that has transmitted the radio beam underlying the report. In a third variant, the reports are forwarded to a node or function of a core network (CN), e.g., an access and mobility function.

Each of the TRPs may be configured to provide radio access to the radio device and/or to serve the radio device. One or more of the TRPs may serve the radio device. Serving the radio device may comprise transmitting and/or receiving data using the at least one serving radio beam for transmission beamforming and/or reception beamforming, respectively.

The plurality of TRPs may comprise TRPs within range of radio communication relative to the radio device, e.g., for a TRP hand-over and/or a TRP selection.

The technique may be implemented as a hierarchical arrangement of antenna elements. At a first hierarchical level, a plurality of antenna elements may be arranged and/or controlled at each of the TRPs for forming the radio beams. At a second hierarchical level, a plurality of the TRPs are arranged and/or controlled in the RAN. The second hierarchical level may be greater in spatial scale than the first hierarchical level. In other words, the antenna elements used through the RAN may be clustered at the TRPs of the RAN.

The technique may be implemented as a method of determining a location of a radio device using beam information for an active mode of the radio device, particularly information on beamforming, precoding of radio beams by discrete Fourier transformation (DFT) and/or directions corresponding to the radio beam.

The technique may be compatible with or extend the standard ISO/IEC 24730-1:2014 and/or the standard 3GPP TS 22.071, e.g., Version 14.1.0.

The method may further comprise or initiate a step of determining a radio propagation direction towards the radio device for each of the at least two TRPs based on the reports. The radio propagation directions combined according to the locating step may include the determined radio propagation directions.

Each of the at least two radio beams used for the locating (i.e., used for the combination) may correspond to a radio propagation direction towards the radio device. Among the radio beams for which a report is received, some or all of those that correspond to a radio beam direction towards the radio device may be used for the locating. These radio beams may also be referred to as preferred radio beams. Herein, a radio propagation direction "towards" the radio device may comprise reflections leading to the radio device.

For example, among a plurality of radio propagation directions reported for any one of the TRPs, the one of the radio propagation directions for which the reported measurement is indicative of a highest gain may determine the radio propagation direction towards the radio device. Herein, the highest gain may refer to the highest signal-to-noise ratio (SNR), the highest signal to noise and interference ratio (SNIR), the highest signal strength (e.g., in terms of reference signal received power, RSRP), and/or the highest signal quality (e.g., in terms of reference signal received quality, RSRQ). The determined radio propagation directions, or at least two of the determined radio propagation directions, may be used in the step of locating the radio device.

The radio beams, which radio propagation directions are combined for the locating, may include, for each of the at least two TRPs, the radio beam with a maximum signal strength or signal quality according to the reports. By way of example, the at least two radio beams used for the locating step may comprise a source radio beam (e.g., the current serving radio beam) and a target radio beam (e.g., a candidate for the serving radio beam) in a mobility process (e.g., a hand-over process).

A weight may be associated with each of the radio beams used for the locating step. The weight may depend on at least one of a gain indicated by the corresponding measurement and a beamwidth of the radio beam. For example, the weight may be an increasing function of the gain (e.g., proportional to the gain). Alternatively or in addition, the weight may be a decreasing function of the beamwidth (e.g., inversely proportional to the beamwidth).

The locating of the radio device may further be based on reported measurements based on radio beams that do not correspond to a radio propagation direction towards the radio device, radio beams corresponding to radio propagation directions neighboring the radio propagation directions of the highest gain and/or radio beams for which the reported measurements are indicative of the second-highest gain. Such radio propagation directions may be associated with a weight in an estimate of the location, which is negative or less than a weight associated with the radio beam directed towards the radio device or having the highest gain.

Each of the radio propagation directions may comprise at least one angle at the TRP transmitting the corresponding radio beam. Each of the radio propagation directions may comprise a horizontal angle (which may also be referred to as an azimuthal angle). Alternatively or in addition, some or each of the radio propagation directions may comprise a vertical angle (which may also be referred to as a tilt or elevation angle). Each of the radio propagation directions may comprise, at the TRP transmitting the corresponding radio beam, an origin and the at least one angle.

The radio propagation directions may be combined for the locating by triangulation or an estimate of triangulation, e.g., using a regression. The at least two radio propagation directions (e.g., each comprising an origin and an associated angle) may be combined by computing at least one (e.g., approximate) intersection. If multiple intersections are computed and/or if more than two radio propagation directions are combined, the location or the area of the radio device may be estimated based on a regression, e.g., a least square sum of distances between the estimated location and the computed intersections. Alternatively or in addition, the location or the area of the radio device may be estimated based on an (e.g., weighted) average of the computed intersections.

Each of the radio propagation directions may correspond to a line (e.g., a straight line or a line of sight) according to the origin and the angle at the respective TRP. The intersection may be a point of intersection between two or more of the lines. Alternatively or in addition, the location or the area of the radio device may be estimated based on a least square sum of distances between the estimated location and the lines. Optionally, the line may comprise one or more reflections of the radio propagation (e.g., one or more kinks in the line) at an obstacle.

Each of the radio propagation directions may comprise, or may be represented by, a probability of presence for the radio device. The probability of presence may be a function of location within the region. More specifically, the radio propagation direction may be a probability distribution in terms of location, e.g., in a vicinity of the respective TRP.

The combination of the at least two of the radio propagation directions may comprise multiplying the respective probabilities of presence for the radio device. The location resulting from the locating step may correspond to a maximum of a product of the combined probability distributions or the area in which the product of the combined probability distributions is greater than a threshold value. Instead of discarding paths of reflected signal propagation (e.g., according to the conventional SpotFi multipath resolution), embodiments of the location technique can use multipath propagation for the locating of the radio device, e.g., for increasing the region covered by the locating or for improving the accuracy of the locating.

The region may be three-dimensional, e.g., including a topography of a terrestrial surface or a combination of terrestrial surface location and height or altitude. Each of the radio propagation directions may comprise or imply at least two angles. The vertical angle (or tilt angle) may be implied by the deployment of an antenna at the respective TRP.

The radio propagation directions of the radio beams may be controlled by means of beamforming at the respective TRP. Alternatively or in addition, the radio propagation directions of the radio beams may be derived from the beamforming at the respective TRP. The beamforming at the respective TRP may define the at least one angle at the TRP transmitting the corresponding radio beam. The radio beams may be controlled by phases of a phased array of antenna elements, e.g., according to a precoding matrix. The radio propagation direction may be derived from the phases or the precoding matrix. Optionally, the reports may be indicative of the precoding matrix.

Each or at least one of the TRPs may comprise a phased array of antenna elements. The phases may be controlled by means of analog phase shifters and/or in the radio frequency domain. The analog phase shifters may be associated (e.g., one-by-one) to the antenna elements.

Alternatively or in addition, the phases may be controlled by means of a precoder in the digital domain and/or in a baseband processor.

The method may further comprise or initiate a step of transmitting a configuration message to the radio device for performing the measurements. The configuration message may be indicative of at least one of a configuration for beam management and a configuration for mobility management. The radio device may perform the measurements and/or transmit the reports according to the configuration.

Each or at least one of the TRPs may transmit radio beams corresponding to different radio propagation directions sequentially in time or simultaneously on different radio frequencies. The different radio beams may cover a cell of the respective TRP. Sequentially transmitting the different radio beams at any one of the TRPs may also be referred to as beam sweeping. The sequence of different radio beams may be periodically transmitted at the respective TRP.

The method may further comprise or initiate a step of mapping each of the radio beams to one or more corresponding radio propagation directions. The reports from the radio device and/or one or more further reports from one or more further radio devices within the region covered by the RAN may be used for mapping the radio beam underlying one or more of the reports to one or more corresponding radio propagation directions. For example, the radio beam may be transmitted according to a directional gain (also referred to as antenna characteristic or antenna diagram). The directional gain may be non-isotropic. The directional gain may be generated by means of the phased array of antenna elements and/or controlled by the phase shifts.

The mapping may be stored in a table (e.g., at each of the TRPs). The table may be indicative of the one or more corresponding radio propagation direction for each of the one or more radio beams transmitted by the respective TRP. The mapping may include measurements for Radio Resource Management (RRM) and/or Minimization of Drive Tests (MDT).

The one or more radio propagation directions corresponding to any one of the radio beams may be determined by the directional gain. For example, a main lobe of the directional gain may determine the corresponding radio propagation direction and/or maxima of the directional gain may determine the one or more corresponding radio propagation directions.

Alternatively or in addition, the one or more radio propagation directions corresponding to any one of the radio beams may be mapped using given locations of the radio device or the further radio devices. The given location may be determined independently from the method. The given location may be expressly reported, e.g., in the measurement reports. The given location may be determined using a satellite positioning system (e.g., the Global Positioning System, GPS, or Galileo), a Service Set Identifier (SSID) of a neighboring Wi-Fi Access point (AP) or a Medium Access Control (MAC) address of a neighboring radio interface. Alternatively or in addition, the radio beams may be mapped to respective radio propagation directions by drive test measurements.

The different radio beams may be distinguished by the radio device based on signals carried by the respective radio beams. The signals (e.g., reference signals) transmitted on different radio beams may be orthogonal.

The radio beams transmitted from the at least two TRPs of the RAN may carry at least one of reference signals and synchronization signals. Each or at least some of the radio beams transmitted by the TRPs may comprise reference signals and/or synchronization signals. The reference signals may comprise mobility reference signals (MRS). The radio beams (e.g., the synchronization signals) may be encoded with an identifier of the TRP and/or the radio beam. The report may include the identifier as a reference to the TRP and/or the radio beam. Alternatively or in addition, the reference signals may comprise CSI reference signals (CSI-RS). Measurements based on position reference signals (PRSs) may be avoided.

The radio beams may be precoded according to a precoding matrix. The radio propagation direction may be derived from or associated with the precoding matrix.

The method may further comprise or initiate a step of evaluating a radio propagation environment of the region. The locating of the radio device may be selectively based on the combination of the radio propagation directions depending on a result of the evaluation. Depending on an intensity of at least one of scattering, spreading, dispersion, reflection and diffraction in the radio propagation environment resulting from the evaluation, the radio device may be located either based on the radio propagation directions or using other location methods, e.g., a non-terrestrial location or a non-directional location.

The mapping step and the evaluating step may be implemented by the same step.

The locating of the radio device may be further based on at least one of a measured time of arrival (ToA, also: time of flight), the measured signal strength and the measured signal quality for signals (e.g., the reference signals or synchronization signals) carried on the radio beams from the at least two TRPs of the RAN. The locating may additionally use distance estimates based on the measured ToA or signal strength or signal quality. For example, an angle may be estimated based on the radio propagation direction. A radius may be estimated based on the distance estimate.

For example, depending on the result of the evaluation, the locating may selectively either be based on the combination of the radio propagation directions or be based on the estimate of time-of-arrival and/or the estimate of signal strength for signals carried on the radio beams from the at least two TRPs of the RAN. The evaluated radio propagation environment may comprise a LOS propagation, a partial-LOS propagation and/or a non-LOS propagation.

The measurements may be beam quality measurements. The reports may be beam quality measurement reports indicative of a beam quality for the radio beams transmitted from the different TRPs of the RAN. The measurements may comprise radio signal measurements. The measurements may be indicative of at least one of signal strength and channel state. The reports may comprise channel state information (CSI) reports.

The measurements may be performed by the radio device as part of a procedure for selecting at least one of the radio beams as a serving radio beam serving the radio device. The procedure for selecting at least one of the radio beams as a serving radio beam may also be referred to as radio beam selection procedure. The radio beam selection procedure may be controlled by the RAN. On the side of the radio device, the radio beam selection procedure may comprise at least one of performing the measurements and transmitting the reports based on the measurements.

The method may further comprise or initiate a step of selecting, based on the reports, at least one of the radio beams as a serving radio beam serving the radio device.

The reports may be indicative of measurements based on radio beams transmitted from two or more TRPs neighboring the radio device. The reports used for the selecting and/or locating may be indicative of measurements based on radio beams transmitted from two or more TRPs that are next-neighbors of the radio device.

On the side of the RAN, the radio beam selection procedure may comprise at least one of receiving the reports and selecting the at least one of the radio beams based on the received reports. The at least one serving radio beam may be selected responsive to a change of a channel condition on the current serving radio beam and/or a change of the location of the radio device.

Two or more of the reports used for the selecting of the at least one serving radio beam may be further used for the locating of the radio device. The locating may be based on measurements performed by the radio device and/or reports from the radio device, which measurements and/or reports are configured at the radio device by the RAN (e.g., first and foremost, i.e., in the first place) for the radio beam selection.

The radio device may be agnostic as to an implementation of the technique. For example, the radio device does not specifically contribute to the locating step. The locating step may be performed solely based on reports received from the radio device for the selecting step. For example, no configuration messages specific for the locating step are transmitted to the radio device and/or no additional reports specific for the locating step are received from the radio device.

The at least one serving radio beam may be identical with, or a subset of, the set of the at least two radio beams used for the locating. For example, the set of the at least two radio beams may comprise the preferred radio beam for the radio device from each of the at least two of the TRPs.

The selecting and the locating may be combined or coordinated steps. For example, the radio beams used for the locating may be the same radio beams used for the selecting or may be a preselection of the radio beams used for the selecting. The at least one serving radio beam may be selected among the radio beams used for the locating.

Each of the radio beams used for the selecting (i.e., candidates for the at least one serving radio beam) may correspond to a radio propagation direction towards the radio device. Among the radio beams for which a report is received, some or all of those that correspond to a radio beam direction towards the radio device may be used for the selecting.

The at least one serving radio beam may be selected among the at least one of the radio beams corresponding to a radio propagation direction towards the radio device. The at least one serving radio beam may be selected based on the measured signal quality or signal strength.

Multiple radio beams may serve the radio device. Multiple of the radio beams may be selected as serving radio beams serving the radio device. The radio beams from different TRPs may include multiple beams from each or at least one of the different TRPs, e.g., for multiple spatial streams between the radio device and any one of the TRPs. Alternatively or in addition, the radio beams from different TRPs may include multiple beams from each or at least one of the different TRPs for a coordinated transmission of data to the radio device and/or a coordinated reception of data from the radio device, e.g., in a coordinate multipoint (CoMP) operation or transmission in a multiple connectivity (MC) mode.

The selecting of the at least one serving radio beam may comprise beamforming or steering the at least one serving radio beam, e.g., for efficient and/or reliable radio communication. The beamforming or steering may be implemented by precoding. The serving radio beam may be beamformed or steered towards the radio device.

The selecting of the at least one serving radio beam may relate to beam management (BM). The selecting of the radio beam may be part of the BM, e.g., the beam steering. The beam management or beam steering may include controlling the beamforming and/or the radio propagation direction at the respective TRP. The beam management may comprise a two-stage beam management. A first stage of the beam management may use one or more radio beams having a beamwidth that is greater than a beamwidth of one or more radio beams used in a second stage of the beam management after the first stage. A narrower radio beam may be selected in the second stage based on the reports. In such a system, the narrower radio beams in the second stage may be used for locating the radio device.

Alternatively or in addition, the selecting of the at least one serving radio beam may relate to mobility management, e.g., beam mobility and/or active mode mobility (AMM). The mobility management may comprise at least one of changing or switching the at least one serving radio beam (e.g., with or without changing the TRP that transmits the at least one serving radio beam) and changing a serving TRP or cell transmitting at least one serving radio beam (which may also be referred to as TRP mobility or cell mobility). The selecting of the at least one serving radio beam may comprise selecting at least one of the TRPs transmitting one or more of the at least one serving radio beam as the serving TRP.

The technique may be implemented at or by the RAN serving the radio device. The method may be performed by one or more TRPs of the RAN. Herein, the TRP may encompass any station that is configured to provide radio access to the radio device. Each of the TRPs of the RAN may be configured to serve and/or locate a plurality of the radio devices.

The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Herein, any TRP may be a base station. Examples for the TRPs may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the RAN, the Internet and/or by the TRPs. Alternatively or in addition, the method may be encoded in a Field-Programmable Gate Array (FPGA) and/or an Application-Specific Integrated Circuit (ASIC), or the functionality may be provided for download by means of a hardware description language.

As to a device aspect, a device for locating a radio device within a region covered by a RAN is provided. The RAN comprises a plurality of TRPs. The device may be configured to perform the method aspect. Alternatively or in addition, the device may comprise a receiving unit configured to receive reports indicative of measurements performed by the radio device based on radio beams transmitted from different TRPs of the RAN. Each of the radio beams may correspond to a radio propagation direction from the respective TRP. The device may further comprise a locating unit configured to locate the radio device based on a combination of the radio propagation directions corresponding to radio beams transmitted from at least two of the TRPs of the RAN.

As to a further device aspect, a device for locating a radio device within a region covered by a RAN is provided. The RAN comprises a plurality of TRPs. The device comprises at least one processor and a memory. Said memory may comprise instructions executable by said at least one processor whereby the device is operative to receive reports indicative of measurements performed by the radio device based on radio beams transmitted from different TRPs of the RAN. Each of the radio beams may correspond to a radio propagation direction from the respective TRP. Execution of the instructions may further cause the device to be operative to locate the radio device based on a combination of the radio propagation directions corresponding to radio beams transmitted from at least two of the TRPs of the RAN.

As to a still further device aspect, a device for locating a radio device within a region covered by a RAN is provided. The RAN comprises a plurality of TRPs. The device may comprise one or more modules for performing the method aspect. Alternatively or in addition, the device may comprise a reception module for receiving reports indicative of measurements performed by the radio device based on radio beams transmitted from different TRPs of the RAN. Each of the radio beams may correspond to a radio propagation direction from the respective TRP. Alternatively or in addition, the device may comprise a location module for locating the radio device based on a combination of the radio propagation directions corresponding to radio beams transmitted from at least two of the TRPs of the RAN.

As to a still further aspect a communication system including a host computer is provided. The host computer may comprise a processing circuitry configured to provide user data, e.g., depending on the location of the UE determined in the locating step. The host computer may further comprise a communication interface configured to forward user data to a cellular network for transmission to a user equipment (UE), wherein the UE comprises a radio interface and processing circuitry, a processing circuitry of the cellular network being configured to execute any one of the steps of the method aspect.

The communication system may further include the UE. Alternatively or in addition, the cellular network may further include one or more TRPs or base stations configured to communicate with the UE and/or to locate the UE according to the method aspect.

The processing circuitry of the host computer may be configured to execute a host application, thereby providing the user data. Alternatively or in addition, the processing circuitry of the UE may be configured to execute a client application associated with the host application.

The device, the TRP or base station, the system or any node or station for embodying the technique may further include any feature disclosed in the context of the method aspect, and vice versa. Particularly, any one of the units and modules, or a dedicated unit or module, may be configured to perform or trigger one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof, Wireless Local Area Network (WLAN) according to the standard family IEEE 802.11, also referred to as Wi-Fi, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
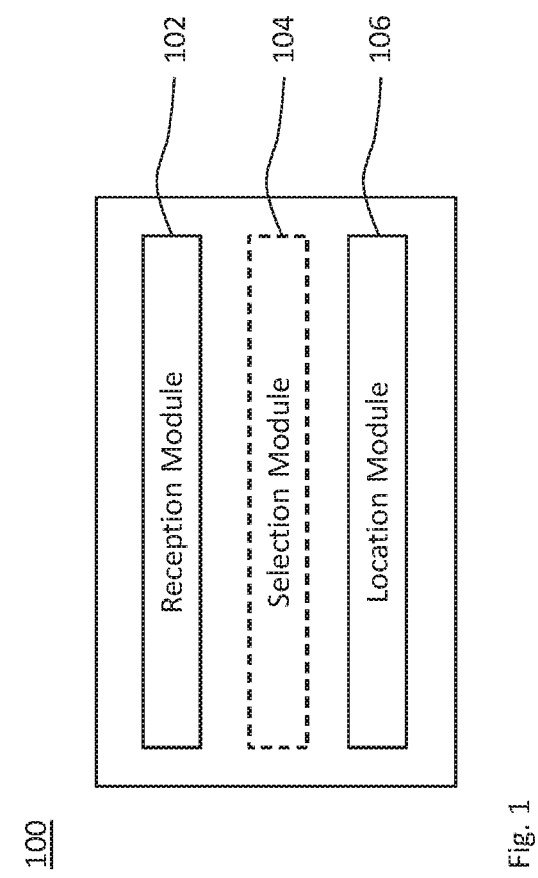
FIG. 1 shows a schematic block diagram of a device for locating a radio device within a region covered by a radio access network comprising a plurality of transmission and reception points.

FIG. 1 schematically illustrates a block diagram of a device for locating a radio device within a region covered by a radio access network (RAN). The RAN comprises a plurality of transmission and reception points (TRPs). The device is generically referred to by reference sign 100.

The device 100 comprises a reception module 102 that performs or initiates receiving reports indicative of measurements performed by the radio device based on radio beams transmitted from different TRPs of the RAN. Each of the radio beams corresponds to a radio propagation direction from the respective TRP. The device 100 further comprises a location module 106 that performs or initiates locating the radio device based on a combination of the radio propagation directions corresponding to radio beams transmitted from at least two of the TRPs of the RAN.

Optionally, the device 100 further comprises a selection module 104 that performs or initiates selecting, based on the reports, at least one of the radio beams as a serving radio beam serving the radio device.

Any of the modules of the device 100 may be implemented by units configured to provide the corresponding functionality.

In one implementation, the device 100 may be part of the RAN. The device 100 may be embodied by or at least one of the TRPs (e.g., a base station) of the RAN, nodes connected to the RAN for controlling at least one of the TRPs or a combination thereof. In another implementation, which is combinable with the one implementation, the device 100 may be embodied by or at one or more nodes of a core network (CN) connected to the RAN, e.g., a mobility management entity (MME) or an access and mobility function (AMF).

Herein, any TRP may be a base station or a remote radio head (RRH). Any TRP may encompass a network controller (e.g., a Wi-Fi access point) or a radio access node (e.g. a 3G Node B, a 4G eNodeB or a 5G gNodeB) of the RAN. The TRP may be configured to provide radio access to one or more radio devices, e.g., including the radio device to be located.

Herein, any radio device may be a mobile or portable station or a radio device wirelessly connectable to the RAN. The radio device may be a user equipment (UE), a device for machine-type communication (MTC) and/or a device for (e.g., narrowband) Internet of Things (IoT).

Figure 2:
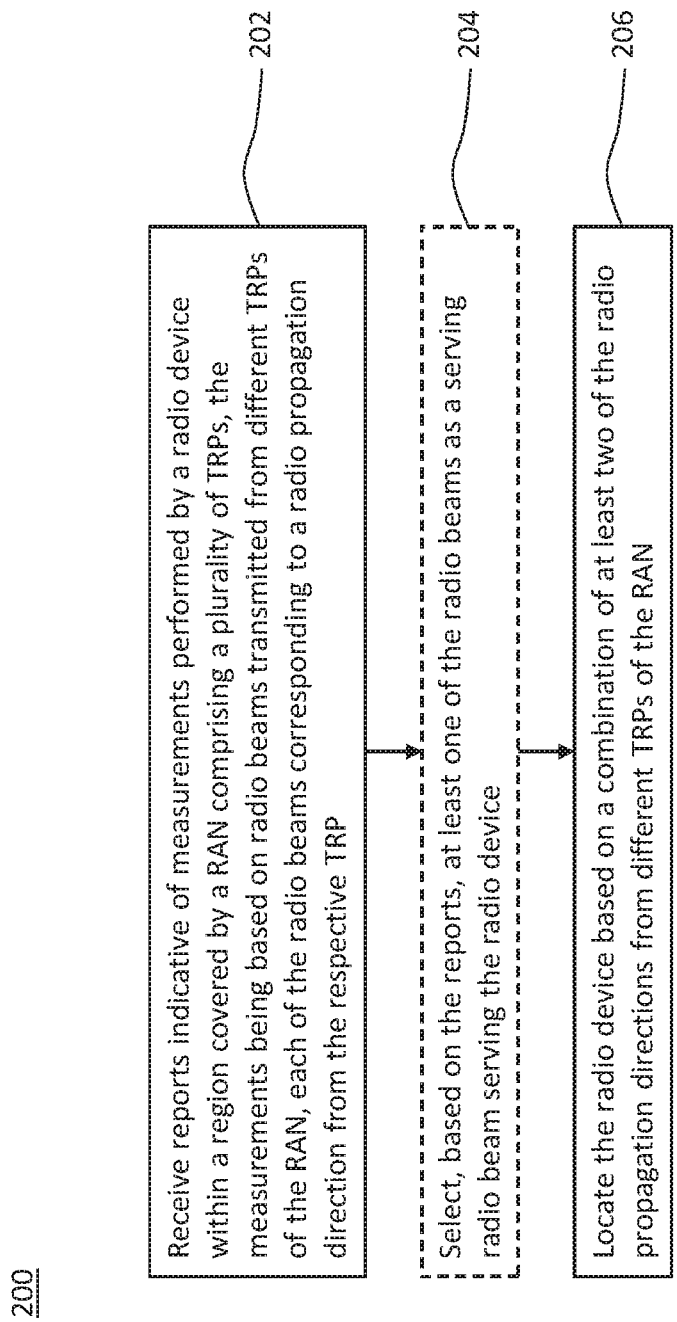
FIG. 2 shows a flowchart for a method of locating a radio device within a region covered by a radio access network comprising a plurality of transmission and reception points, which method is implementable by the device of FIG. 1.

FIG. 2 shows a flowchart for a method 200 of locating a radio device within a region covered by a RAN comprising a plurality of TRPs. The method 200 comprises a step 202 of receiving reports indicative of measurements performed by the radio device based on radio beams transmitted from different TRPs of the RAN. Each of the radio beams corresponds to a radio propagation direction from the respective TRP. The method 200 further comprises a step 206 of locating the radio device based on a combination of the radio propagation directions corresponding to radio beams transmitted from at least two of the TRPs of the RAN.

Optionally, the method 200 further comprises a step 204 of selecting, based on the reports, at least one of the radio beams as a serving radio beam serving the radio device. The step 204 may be triggered by certain events or occasions. For example, the step 204 is performed when a handover procedure is initiated and/or when the serving beam is changed. Alternatively or in addition, the step 204 is not performed during certain periods, e.g., between such events or when no handover or mobility action is performed.

The method 200 may be performed by the device 100, e.g., at or by at least one of the TRPs. The modules 102, 104 and 106 may perform the steps 202, 204 and 206, respectively.

The method 200 may be implemented at the RAN, e.g., at a cellular network. The step 206 may determine the physical position of the radio device. The technique may be transparent for the radio device. For example, the technique may be implemented at the RAN without requiring a locating-specific implementation or cooperation of the radio device. The technique may use an appropriately selected set of already available preferred beam information.

The radio beams used for the combination in the step 206 may comprise the radio propagation direction of one or more currently serving radio beam and/or one or more candidates for the serving radio beam (e.g., the best radio beam candidate) from multiple TRPs 100. The reports may refer to the transmitted radio beams using identifiers of the respective TRP and/or identifiers of the respective radio beam. The radio beams for which the measurement report is received from the radio device may also be referred to as an evaluated radio beam.

The combination in the locating step 206 may further comprise beam quality information with known transmission directions of the evaluated beams. In a preferred embodiment, the beam quality information may be obtained from conventional active mode beam mobility or beam management measurements and reports from the radio device.

Any implementation of the method 200 may comprise a step of determining a set of radio beam information (e.g., the beam quality information) to be used by the locating step 206. Alternatively or in addition, any implementation of the method 200 may comprise a step of determining a locating mode (also: positioning mode). The locating mode may define the combination (e.g., triangulation and/or trilateration) in the locating step 206. Alternatively or in addition, the locating step 206 may be selectively performed depending on the determined locating mode. For example, the locating step 206 may be performed if (e.g., only if) one or a subset of the locating modes is determined.

The locating mode may be determined depending on specifics of the RAN and/or specifics of a deployment of the RAN. The specifics may relate to radio propagation in the environment of the RAN or under a current situation of the RAN, e.g., in the region covered by the RAN or a region of interest of the RAN. The locating mode may be determined to maximize performance in a line of sight (LOS) environment or LOS situation, in a partially-LOS environment or partial-LOS situation and/or in a non-LOS environment or non-LOS situation of the RAN. For example, the locating modes may comprise at least one of a LOS mode, a partially-LOS mode and a non-LOS mode. The respective modes may be applied responsive to a corresponding environment or situation of the RAN. The non-LOS environment or non-LOS situation may comprise radio propagation conditions that are highly dispersive or diffusive and/or that give rise to substantial angle spread. For example, in the non-LOS environment or non-LOS situation, nominal beam directions (e.g., as defined by a Poynting vector) are not well maintained by the radio propagation.

In the LOS mode, each of the radio propagation directions may comprise an angle and the combination in the step 206 may comprise a triangulation based on the angles. In the partial-LOS mode, each of the radio propagation directions may comprise a probability distribution for the presence of the radio device and the combination in the step 206 may comprise multiplying the probability distributions. In the non-LOS mode, an alternative locating method may be performed. The alternative locating method may be a conventional locating mode, e.g., using satellite positioning and/or using a data base mapping Wi-Fi Service Set Identifiers (SSIDs) to locations.

The step of determining the radio beam information and/or the step of determining the locating mode may be embodied by a control mechanism, e.g., at the device 100. The control mechanism may determine whether to operate in one of the above modes or to revert to the conventional locating mode.

Figure 3:
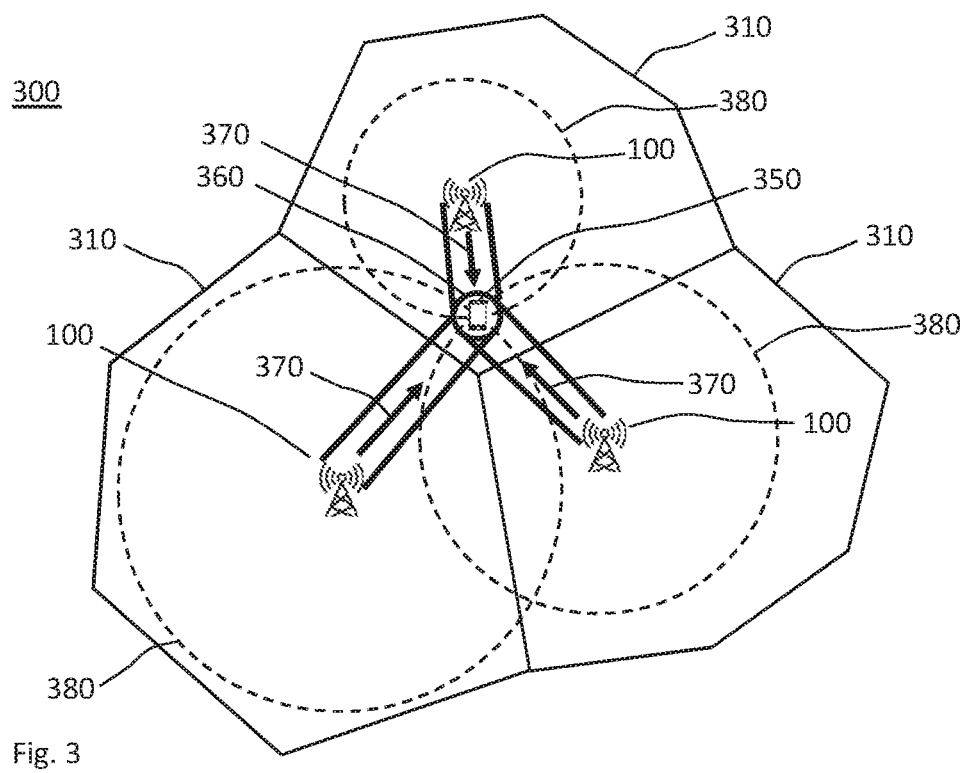
FIG. 3 schematically illustrates an exemplary environment for implementing the device of FIG. 1 and the method of FIG. 2.

The RAN may be a Wireless Local Area Network (WLAN) or a cellular network. FIG. 3 schematically illustrates an exemplary RAN 300 for implementing the technique. The RAN 300 includes at least two TRPs 100, e.g., base stations or nodes, each configured to provide radio access, e.g., each within one or more cells 310. The method 200 may be implemented by at least one of the TRPs 100. For example, one of the TRPs 100 may perform the method 200 based on reports directly received from the radio device 350 or received and forwarded by the other TRPs 100 in the RAN.

The radio device 350 is within range for radio communication with at least two of the TRPs 100. As schematically illustrated in FIG. 3, the range of radio communication for the purpose of locating the radio device 350 may be farther than the region of the corresponding cell 310 for each of the TRPs 100. For example, the radio device 350 may be within range of radio communication with at least two of the TRPs 100 for TRP selection, radio beam selection, or TRP mobility (also: hand-over) and/or radio beam mobility.

For a given number of TRPs 100 within range for the radio device 350, embodiments of the technique can locate the radio device 350 more accurately than the conventional technique relying exclusively on exact estimates of the distance 380 between the radio device 350 and the respective TRP. Same or further embodiments of the technique do not need the radio device 350 to perform additional procedures such as a random access (RA) procedure towards multiple TRPs for estimating a timing advance (TA) and/or measuring and reporting of positioning reference signals (PRSs). For example, the technique may advantageously be implemented without locating-specific signaling overhead and/or without a locating-specific processing overhead of the radio device 350. More specifically, the beam sweeping of PRSs at the TRPs 100 and corresponding PRS measurements at the radio device 350 can be avoided. The measurements performed by the radio device 350 and the reports transmitted by the radio device 350 may correspond (e.g., in type and extent) to existing procedures and signals for establishing or maintaining an active mode of the radio device 350 with the RAN.

A location 360 of the radio device 350 is determined in the step 206 based on the combination of at least two radio propagation directions 370. For example, each of the radio propagation directions 370 comprises an origin and an angle. The combination may comprise a triangulation using the radio propagation directions 370 resulting in the location 360. The location 360 may be a point within the region covered by the RAN 300, e.g., the point with the greatest probability of presence given the combined radio propagation directions 370, or an area, e.g., the area including the radio device 350 with a probability of presence equal to or greater than a predefined threshold value, e.g., 68% or 95%.

The angles of the radio propagation directions 370 in conjunction with the TRP locations as the origins may be used to derive the location of the radio device 350. Particularly in radio environments of the RAN 300 with LOS radio propagation, the triangulation can be more accurate than the trilateration. Furthermore, each of the radio propagation directions 370 may be mapped to or correspond to a probability distribution for the presence of the radio device 350.

This probability of presences may be determined also for partial-LOS or non-LOS environments of the RAN 300, e.g., by including reflections and attenuations.

Figure 4:
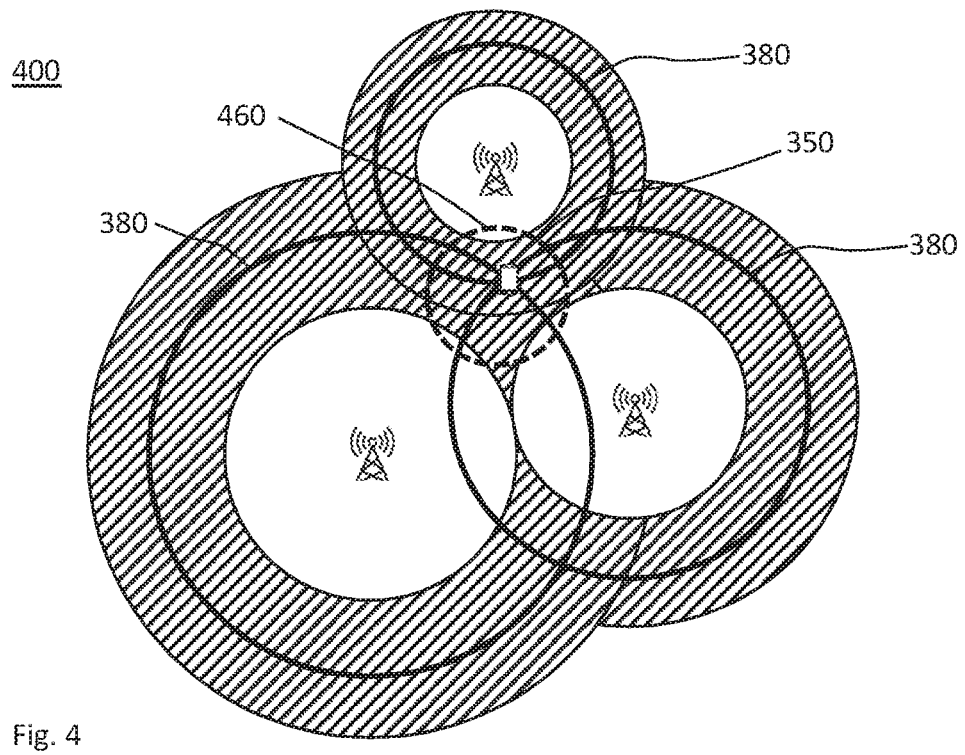
FIG. 4 schematically illustrates a location accuracy based on distance estimates.

FIG. 4 schematically illustrates a comparative example 400 of a RAN that locates the radio device 350 solely based on distance estimates 380, i.e., trilateration. An error or uncertainty of the distance estimate 380 is indicated by the dashed width of the annuli around the TRPs of the RAN. The positioning accuracy 460 rapidly deteriorates as the error or the uncertainty increases. For example, distance estimates 380 based on the time metrics, such as the TDOA or the TA, may be affected by a limited PRS or physical PRACH signal frequency span respectively, and by unknown inter-node timing misalignment. Furthermore, distance estimates 380 based on signal quality (e.g., in the uplink or downlink) may be affected by fading variations and inaccurate power-to-distance mapping models.

As schematically illustrated in FIG. 4, the error or uncertainty in the distance estimates 380 leads to an incorrect trilateration, which in turn may lead to, e.g., inaccurate dispatching of emergency medical services (EMS) or irrelevant advertisement distribution via services relying on the location (i.e., the physical position) of the radio device 350. A conventional triangulation based on angles of arrival (AoA), e.g., according to SpotFi, might mitigate the incorrect trilateration but may be not robust in radio environments that do not allow for LOS propagation.

Preferably, the combination in the step 206 comprises a triangulation and, optionally, a trilateration. For example, the triangulation described for the RAN 300 may be combined with the trilateration described with reference to the example 400 to further improve the locating accuracy of the triangulation. In a 3GPP NR (or "5G") implementation of the RAN 300, downlink TDOA measurements defined by a 3GPP standard may be used in addition to the known radio propagation directions.

The radio device 350 may measure and report signal quality (e.g., a channel quality indicator, CQI) or signal strength (e.g., a received signal power) of the radio beams with respect to multiple of the TRPs 100. In an LTE implementation of the RAN 300, the radio beams may carry a cell-specific reference signal (CRS), a channel state information reference signal (CSI-RS) or primary and secondary synchronization signals (PSS and SSS, respectively). The triangulation may use the signal strength or signal quality by determining the radio propagation directions 370 used for the combination in the step 206 depending on the signal strength or signal quality. The trilateration may use the signal strength or signal quality by mapping the signal strength or signal quality to the geometrical distance 380, e.g., according to a predetermined model.

Moreover, system access signals and procedures enable a trilateration of the radio device 350 without additional signals from and to the radio device 350 or without additional procedures at the radio device 350. The radio device 350 may be induced to perform random access (RA) towards multiple TRPs (e.g., eNodeBs) 100 and the timing advance (TA) estimation mechanism may be used to estimate the distance 380 of the radio device 350 from the respective TRP 100.

Figure 5:
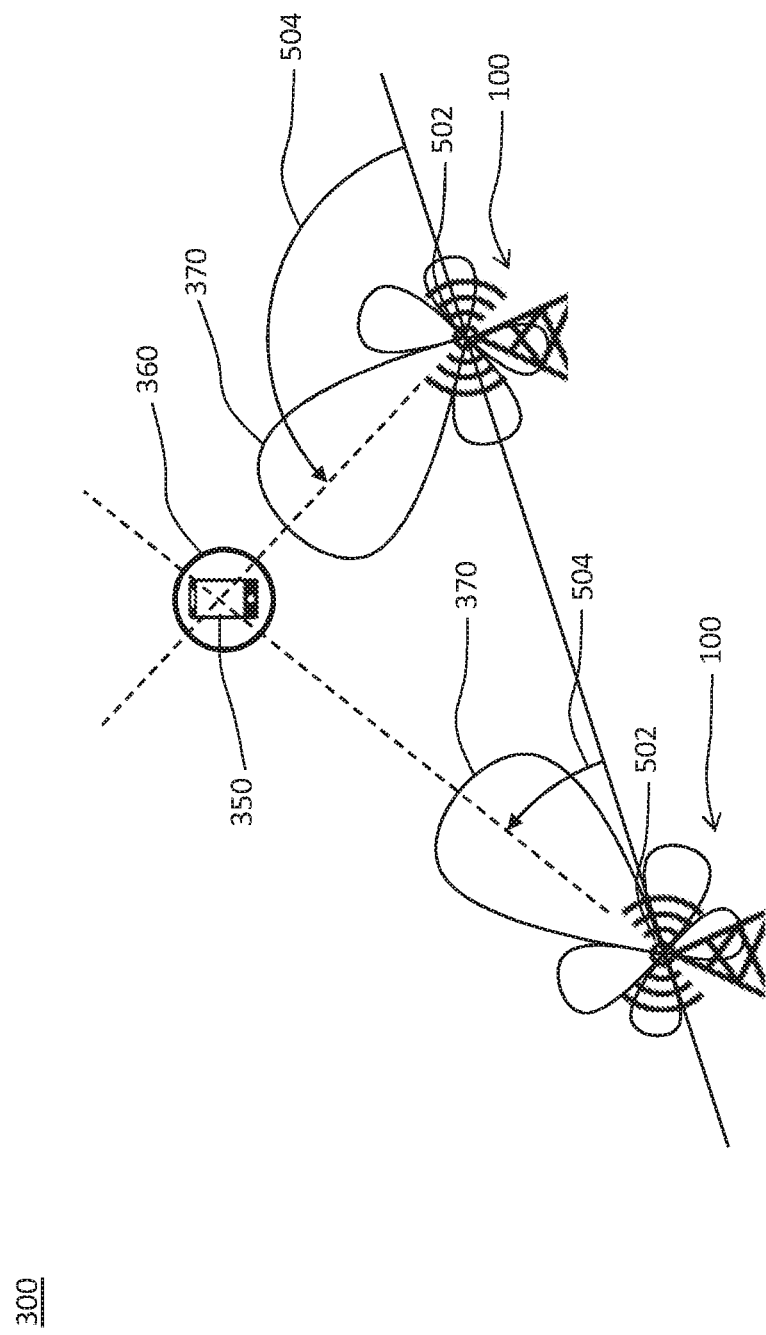
FIG. 5 schematically illustrates a location accuracy based on radio propagation directions.

FIG. 5 schematically illustrates a first implementation of the step 206 for the combination of at least two radio propagation directions 370. Each radio propagation direction 370 comprises an origin 502 and an angle 504, e.g., relative to a baseline comprising at least two of the origins 502 or relative to an antenna orientation at the respective TRP 100.

The origin 502 may be defined by the location of the antenna of the respective TRP 100. The angle 504 of the radio propagation direction 370 may be defined by a weight vector (e.g., phase shifts) applied to antenna elements of the respective antenna. For example, the antenna elements may be arranged in a horizontal array and the phase shifts may correspond to a common phase offset between neighboring antenna elements. The angle 504 may be derived from and/or controlled by the common phase offset applied at the TRP 100 when transmitting the respective radio beam.

Figure 6:
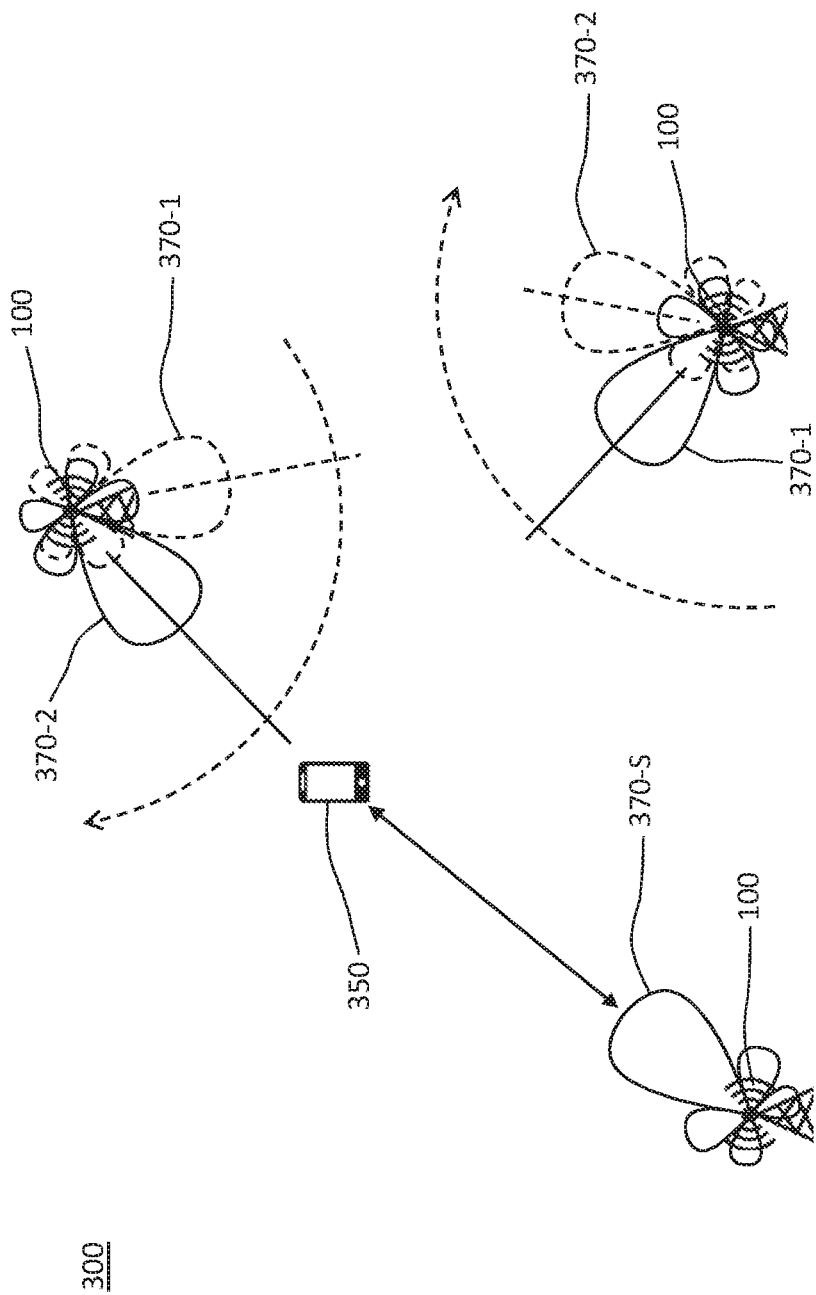
FIG. 6 schematically illustrates embodiments using beam sweeping for transmitting radio beams.

FIG. 6 schematically illustrates a second implementation of the step 206 for the combination of more than two radio propagation directions 370. The second implementation may comprise any of the features of the first implementation.

The location determined in the step 206 may minimize distance metrics between the radio device 350 and each of the line of sights according to the radio propagation directions 370. More specifically, the squares of the distances may be minimized. Optionally, the squared distances may be weighted, e.g., according to a signal quality indicated by the corresponding report from the radio device 350.

In any of the implementations, the radio device 350 may be in an active mode or radio resource control (RRC) connected mode relative to the RAN. At least one of the TRPs 100 (also referred as serving TRP) may transmit a serving radio beam with a radio propagation direction 370-S towards the radio device 350, e.g., for downlink data transmission. The radio propagation direction 370-S of the serving radio beam is one of the at least two radio propagation directions that are combined according to the step 206.

By way of example, at least one of the TRPs 100 (e.g., at least one or each of the non-serving TRPs) transmits a sequence of radio beams with different radio propagation directions, e.g., as indicated at reference signs 370-1 and 370-2 in FIG. 6. The transmission of a sequence of radio beams is also referred to as beam sweeping. For each of the TRPs 100 performing beam sweeping, the radio beam direction that is directed towards the radio device 350 (e.g., as indicated by solid lines in FIG. 6) is determined among the sequence of radio beams. The radio propagation directions 370 of the radio beams directed towards the radio device 350 are among the at least two radio propagation directions that are combined in the locating step 206.

Figure 7:
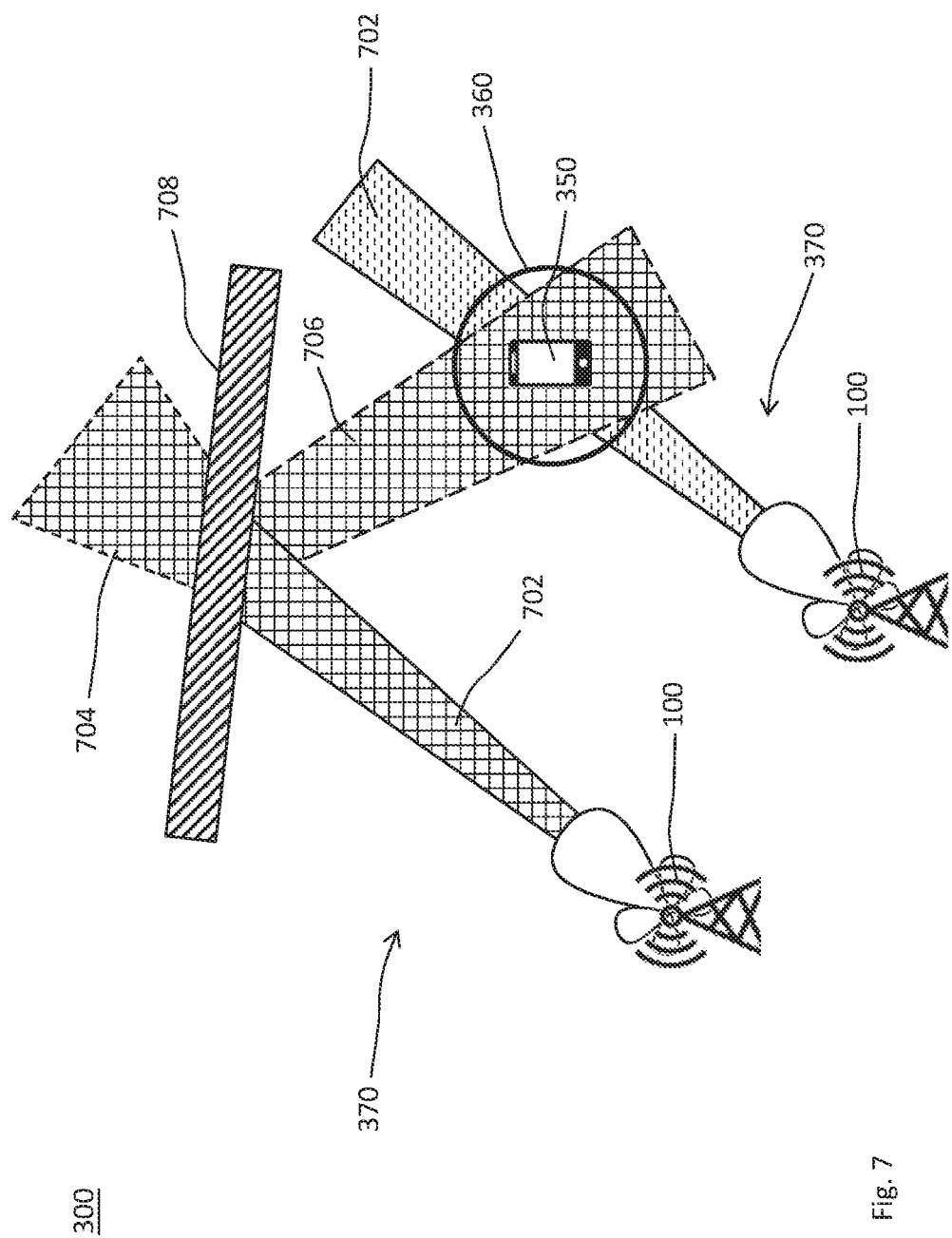
FIG. 7 schematically illustrates embodiments using a probability of presence corresponding to the radio propagation direction.

FIG. 7 schematically illustrates a third implementation for the combination of two or more radio propagation directions 370 in the locating step 206. The third implementation may comprise any of the features of the first implementation and/or the second implementation. At least one of the radio propagation directions 370 includes a direct branch 702 that irradiates upon an obstacle 708 causing a transmissive branch 704 that propagates through the obstacle 708 and/or a reflective branch 706 that is back-scattered from the obstacle 708.

More specifically, the radio propagation direction 370 is represented by a function of location, which is indicative of the probability for the mobile device 350 to be present in said location. The probability for a location may be proportional to an intensity of the electromagnetic radiation of the branch 702 (and where applicable the branch 704 and/or 706) at the location. The probability of presence may result from a mapping between a measured signal power (e.g., a measured reference signal received power, RSRP) and a known location. The mapping may be performed at deployment of the RAN and/or by means of drive tests.

Based on two or more reports received from the radio device 350 in the step 202, the at least two radio propagation directions are combined in the step 206 by multiplying the probability of presence of the at least two radio propagation directions. A maximum of the product may correspond to the determined location 360 of the radio device 350.

At least one or each of the different TRPs 100 may use beamformed transmissions for transmitting the radio beams. The radio beams may be generated by an antenna comprising a (e.g., large) antenna array for data transmission and/or data reception, e.g., in a modern cellular RAN such as a 5G NR system. The antenna array is configured to transmit and/or receive signals in narrow beams, i.e., the signal strength or antenna gain is increased in one or more (e.g., few) directions. The selected one or more serving radio beams allow reducing interference in other directions and/or increase frequency reuse. For example, the selected serving radio beam can improve link quality, e.g., enable a spatial separation and reduce interference between different radio devices 350 served by the RAN 300. Alternatively or in addition, the antenna array can ensure sufficient link quality in high-frequency deployments, wherein apertures of the individual antenna element are small and do not capture sufficient signal energy individually. Coherently aligning (for transmission) or combining (for reception) signals of the antenna elements gives rise to an effective beam gain and/or beam directivity in a certain direction.

In the active mode, the radio connection of a moving radio device 350 is seamlessly handed over as the radio device 350 moves across the different cells 310, i.e., the coverage areas of the cells 310, in the RAN 300. Handover is the process of transferring an ongoing radio connection of a radio device 350 from one TRP (i.e., the serving TRP) to another TRP 100 (the target TRP), from one cell 310 (i.e., the serving cell) to another cell 310 (i.e., the target cell) optionally within the same TRP and/or from one radio beam (i.e., the serving radio beam) to another radio beam (i.e., the target radio beam) optionally within the same cell 310 or same TRP 100. The handover can enable a user-transparent service or service continuity over a larger area, e.g., the region covered by the RAN. The handover should happen without any loss of data and preferably with no interruption of the service, e.g., the service described with reference to FIGS. 11 to 14.

The mobility in a cellular (also: cell-based) RAN 300 may be based on the measurements and the reports indicative of the measurements. In other words, the measurements may comprise mobility measurements. For example, the handovers may be triggered depending on the reported measurements.

In an existing cellular RAN 300 (e.g., according to LTE), pilot signals (e.g., the CRSs) are used for the mobility measurements. The pilot signals are broadcasted in all neighbor cells (e.g., relative to the serving cell of the radio device 350) in an always-on manner over the entire bandwidth (i.e., distributed on radio resources in time and frequency). In other words, the pilot signals are transmitted by the TRPs 100 regardless of the presence or locations of the radio devices 350 in the RAN 300, which is also referred to as static pilot signaling. The pilot signals are easy to measure and yield consistent results, but the static pilot signaling leads to high resource usage, power consumption and constant inter-cell interference generation in the downlink. All TRPs continuously transmit pilot signals that each radio device 350 uses to estimate the signal strength or signal quality for its own cell (i.e., the serving cell) and neighbor cells (i.e., candidate cells). In an LTE RAN 300, the CRSs are examples for the pilot signals. In a GSM RAN 300, examples for the pilot signals are transmitted on the broadcast control channel (BCCH). In a RAN 300 using WCDMA such as UMTS, examples for the pilot signals are transmitted on the common pilot channel (CPICH). In a Wi-Fi RAN, the beacon frames comprise examples for the pilot signals. Each radio device 350 performs periodic measurements and reports the measurement results to the RAN 300, e.g., if certain reporting conditions are met (e.g., periodic or event based). If the RAN 300 (e.g., the serving TRP) determines that the signal strength or signal quality of the serving cell is getting close to another candidate cell, a more detailed measurement process or a handover procedure may be initiated.

Moreover, initial access signals, e.g., synchronization signals (e.g., the PSS and the SSS) or other associated signals (e.g., a master information block or system information blocks), if transmitted at a sufficient rate, may also be used for the mobility measurements in the active mode. They allow estimating the link qualities with respect to the candidate cells, for the purposes of measurement reporting back to the RAN 300.

In beam-based RANs 300, the identities of the serving TRP 100 and the target TRP 100 may be insufficient for maintaining seamless connections during inter-node handover. The handover or mobility (also: mobility management) includes a transition (which is also referred to as radio beam switching or radio beam handover) between (e.g., narrow) radio beams transmitted by neighboring TRPs 100. For example, the serving TRP 100 decides if radio beam switching is necessary.

Moreover, the serving TRP 100 performs radio beam steering. Radio beam steering includes controlling the radio propagation direction 370 of the (e.g., narrow) serving radio beam (which is also referred to as radio beam updating or radio beam controlling) within the serving TRP 100 or serving cell 310. The radio link may thus effectively be the serving radio beam through which the TRP 100 is currently communicating with the radio device 350. The serving radio beam may be steered continuously, e.g., by controlling the phase shifts, or discontinuously, e.g., by selecting among a set of radio beam candidates.

Hence, mobility management of the radio beam and steering of the radio beam include switching or controlling the currently serving radio beam with or without changing the serving TRP 100.

In a beam-based RAN 300, e.g., according to 3GPP NR, it is advantageous to avoid excessive static downlink reference signal (RS) transmissions. Rather, the RAN 300 may transmit mobility reference signals (MRSs) only when needed, e.g., either when there are radio devices 350 found in a given sub-region of the RAN 300, or in a UE-specific manner only in relevant candidate radio beams, e.g., radio beams directed towards the radio device 350.

The reference signals may be transmitted periodically or when the RAN 300 determines that a radio beam update for the radio device 350 may be needed, e.g. when decreasing serving beam quality is detected.

Each activated radio beam transmits an MRS that carries the identity of the respective radio beam. For example, the radio beams carrying the MRSs are transmitted as a sweep of multiple radio beams in time and/or frequency. Each of the multiple radio beams has radio propagation direction (also: a characteristic transmission direction). Each of the multiple radio beams can be distinguished by determining its radio beam identity, e.g., when received or measured by the radio device 350. The report may include a result of the measurement in conjunction with the corresponding radio beam identity.

In a beam-based RAN 300, various MRS measurement and reporting strategies may be employed. In a RAN 300, e.g., according to 3GPP NR or LTE, the radio device 350 may continuously monitor a received sample stream (e.g., a received digital baseband signal) for the presence of an MRS. If some event criterion is fulfilled, e.g. any MRS is detected with signal quality exceeding a threshold value, the radio device 350 reports the identity of the received radio beam and, optionally, its signal quality to the RAN 350, e.g., to its serving TRP 100.

Alternatively or in addition, e.g., in a RAN 300 according to 3GPP 5G NR, the RAN 300 (e.g., the serving TRP 100) triggers MRS measurements by transmitting a measurement command via control signaling, e.g. when a degrading quality of the serving radio beam or another reason for initiating mobility measurements is identified. The measurement command may contain reporting instructions and, in some embodiments, an explicit list of MRS to measure. The serving TRP 100 and/or other TRPs 100 (e.g., TRPs that are candidates for a target TRP) reserve uplink radio resources for receiving the measurement reports in the uplink. If a report is received by a TRP 100 other than the serving TRP 100, or if the serving TRP is not embodying the device 100 performing the method 200, the report may be forwarded to the serving TRP 100 and/or the device 100 performing the method 200.

The reports may be used for mobility decisions according to the step 204 and/or for building a database at TRP resolution level or radio beam resolution level. The database may associate a UE in a certain cell with one or more neighbor cells within range of radio communication for the UE and/or may associate a UE receiving a certain radio beam with one or more other beams receivable for the UE. The one or more other radio beams may be transmitted from the serving TRP and a neighbor TRP. The database may store automatic neighbor relations (ANR). The ANR database may be part of a Self Organizing Network (SON).

The measurements of reference signals for mobility management and/or steering of the radio beam, e.g., the measurements of the MRSs, may also be referred to as active mode mobility (AMM) measurements. A signal structure of the MRS (e.g., for 5G NR) may be equal to or similar to the signal structure of the CSI-RSs. In NR, a beam-swept MRS may be implemented as a PSS/SSS transmission or fixed sweep configuration. Alternatively or in addition, a beam-swept MRS may be implemented as an active mode mobility CSI-RS transmission or dynamic sweep configuration, in which case an activation and deactivation may be possible. Using CSI-RS for AMM may be beneficial for at least one of the following scenarios. A first scenario includes inter-TRP mobility in multi-TRP cells, wherein a synchronization signal (e.g., PSS and/or SSS) is transmitted as single-frequency network (SFN) transmission. A second scenario includes a beam mobility resolution that is greater (i.e., finer) than the PSS/SSS beam sweep resolution. In a third scenario includes wide-band measurements for improved fading robustness in moderately dispersive environments of the RAN 300 or for improving measurement accuracy.

In contrast to synchronization signals, the CSI-RSs may be dynamically turned on and off. Alternatively or in addition, the CSI-RSs may be configured according to suitable parameters such as a periodicity, a bandwidth, a number of unique links supported, etc. The parameters may be configured by the RAN 300, e.g., based on the presence of the radio devices 350 and their mobility needs.

The measurements reported in the step 202 may be based on any one of the reference signals and/or synchronization signals disclosed herein. That is, the radio beams transmitted from the different TRPs 100 may carry any one of the reference signals and/or synchronization signals disclosed herein. Furthermore, each of the radio beams may carry a unique identifier of the respective radio beams.

The technique is applicable to emergency services. E.g., the radio device 350 used or carried by an emergency caller may be located according to the method 200. Alternatively or in addition, the technique is applicable to cargo tracking or theft protection, e.g., by attaching the radio device 350 to the cargo or goods. Alternatively or in addition, the technique is applicable to services using the location as a service parameter or context dependency, such as search engines, speech recognition and augmented reality. E.g., the location determined in the step 206 may be used by a host computer, such as the host computer described below with reference to any one of FIGS. 11 to 14. The technique is also applicable to a combination of the services. For example, the location of a wearable device may be determined if the wearable device detects a fall down or critical health condition.

Figure 8:
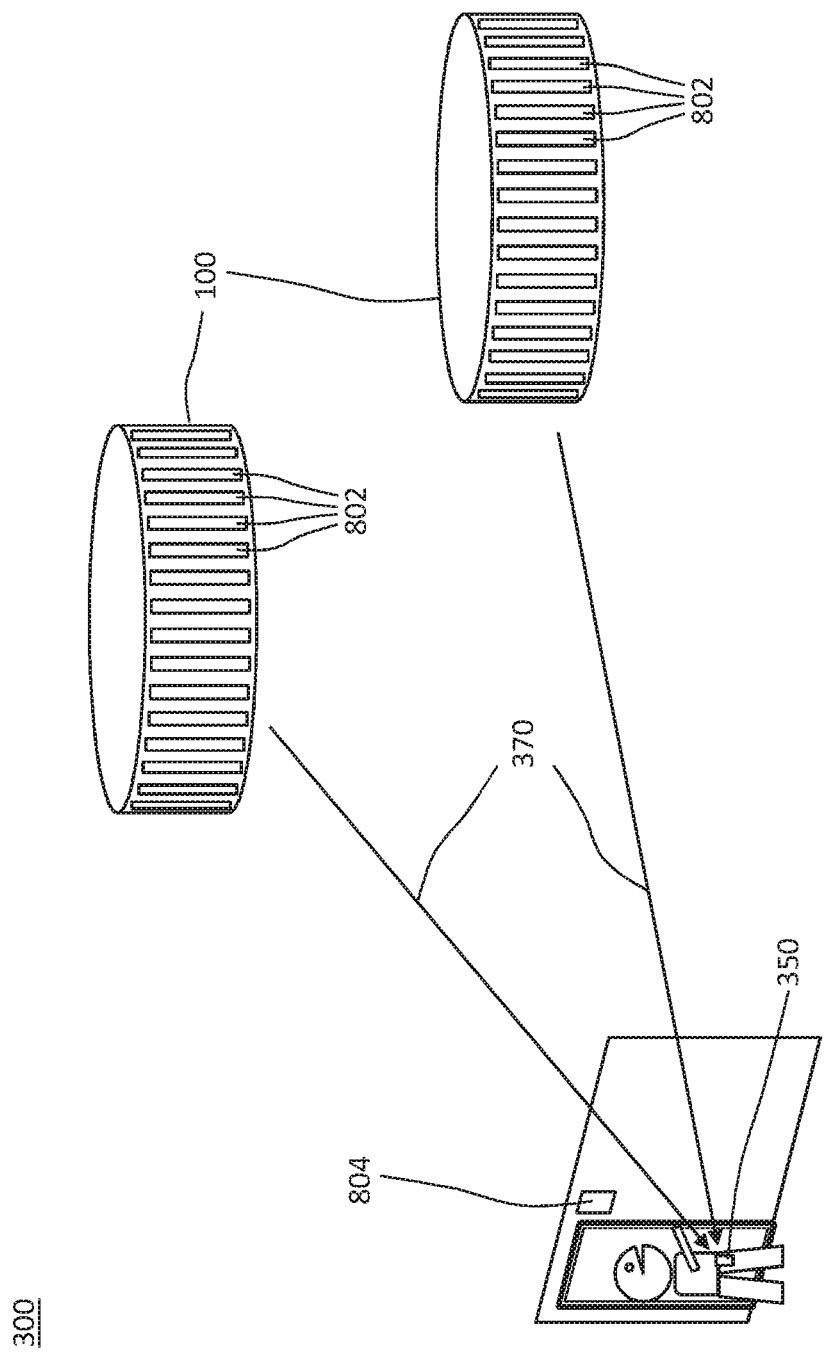
FIG. 8 schematically illustrates embodiments of the device of FIG. 1 for home automation.

FIG. 8 schematically illustrates an example of a micro RAN or a stand-alone RAN 300, for example an access control system or home automation system. The RAN 300 comprises at least two TRPs 100, e.g., microcells or Wi-Fi APs, each or collectively implementing the method 200.

As schematically illustrated in FIG. 8, each of the TRPs may comprise an array of antenna elements 802 for a beamforming transmission of the radio beams within a building or in a vicinity of the building. By combining the radio propagation directions 370 of radio beams from at least two of the TRPs 100, the location of a radio device 350 is determined according to the step 206. When the determined location is consistent with a location outside of the building and/or a neighborhood of an entrance door, a door lock 804 may be released and/or a door opening mechanism 804 may be triggered for keyless entry.

An implementation of the method 200 is described for locating a UE as the radio device 350. The RAN 300 utilizes the reports indicative of the measurements on the radio beams (i.e., radio beam reporting information) from the UE 350 with respect to two or more TRPs 100. The reports are collected as part of conventional beam management or beam mobility procedures.

In an optional mapping step (not shown in FIG. 2), each of the radio beams is associated with or mapped to the corresponding radio propagation direction 370. For example, an antenna diagram or directional gain is determined for each of the radio beams. Alternatively or in addition, the radio propagation directions 370, that each of the radio beam covers, are mapped.

Alternatively or in addition, in an optional configuring step (not shown in FIG. 2), the UE 350 is configured (e.g., by its serving TRP 100) for beam management and/or a mobility procedure. For example, the TRP 100 transmits a configuration message to the UE 350. The configuration message may trigger the UE 350 to perform the measurements and report results of the measurements. The configuration message may be indicative of identifiers of the radio beams to be measured and/or criteria for selectively transmitting the reports depending on the result of the measurements.

In the step 202, radio beam information is obtained from the beam management and/or the mobility procedure with respect to two or more TRPs 100. The radio beam information may comprise the reported results of the measurements and the radio propagation directions 370 of the radio beams underlying the measurements.

In the step 206, a location of the UE 350 (also referred to as UE position) is determined based on at least the radio propagation directions 370 (also referred to as beam direction information). Optionally, the locating step 206 is further based on the reported results of the measurements, e.g., information on the signal quality or signal strength (also referred to as beam information). For example, the radio beams used for determining the location may be selected based on the reported results of the measurements.

In the optional mapping step, the TRP 100 (e.g., a base station) maps each identifier of the radio beams transmitted by said TRP 100 to one or more radio propagation directions 370, e.g., one or more lobes of the direction gain. Each of the radios beams may correspond to more than one radio propagation direction 370 since individual beams may have one or several main directions and additionally a number of side lobes. TRPs 100 with more complex antenna diagrams for the radio beams may comprise a look-up table of all of the radio propagation directions 370 and antenna gain for each of these radio propagation directions.

In the optional configuring step, the UE 350 may be configured for beam management or mobility measurements in a way that facilitates the locating (also referred to as positioning). For example, the RAN 300 may specify a number of radio beams to be reported, rates for the measurements and the reporting, etc. that provide information useful for the positioning task, e.g., for the mapping step and/or the locating step 206. In other embodiments, the UE 350 may use a default configuration for performing the measurements and the reporting. For example, the RAN 300 (e.g., the serving TRP 100) may transmit a configuration message for performing the measurements and the reporting underlying the radio beam selection in the step 204. The radio beam selection 204 may relate to at least one of radio beam management (BM) and AMM.

In step 202, the RAN 300 obtains beam information with respect to multiple TRPs 100. The beam information includes at least the identity of the preferred radio beam for the UE 350 from each of the multiple TRPs 100. These identities are mapped to the corresponding radio beam direction 370. The beam information may also include information about next-best radio beams or neighbor radio beams (e.g., radio beams that are neighboring the preferred radio beam in terms of direction or angle). Furthermore, the beam information may further include information on the signal strength (e.g., RSRP) and/or the signal quality (e.g., RSRQ, SINR, etc.) for the reported radio beams.

In the locating step 206, the UE position is determined. In some embodiments, the position estimate may be based solely on the estimated or derived angles 504 of the transmitted radio beams and the respective TRP physical locations 502. The angles 504 are derived based on the antennary array geometry, a mounting angle and/or phase shifts (e.g., each known to or retrieved by the RAN 300, particularly the TRP 100 performing the method 200). The angles 504 of the preferred beam directions or the radio beams directed to the UE 350 from each of the multiple TRPs 100 may be used in the step 206. Alternatively or in addition, e.g., in a fixed-beam AMM or BM arrangement, the angles 504 may be based on a relationship between the signal quality of the preferred beam and the signal quality of the neighbor beam (i.e., the radio beam neighboring the preferred beam at the same TRP 100). By comparing these signal qualities, a nominal beam direction corresponding to the preferred beam may be further corrected based on how close in terms of signal quality the respective neighbor beams are. For example, if the neighbor beam is almost as strong as the preferred beam, the estimate for the angle 504 may be corrected to lie half-way in between the preferred beam and its neighbor beam.

A triangulation in the step 206 may be implemented for determining the UE position as the crossing point of lines corresponding to the combined radio propagation directions 370 or estimated from an overdetermined set of radio propagation directions 370. The estimate may use a minimum mean square error (MMSE) metric.

Optionally, the position estimate according to the step 206 may further be based on the signal strength or signal quality reported for the radio beams used in the combination. A signal strength or signal quality may be used to augment the radio propagation directions 370 combined in a position estimation algorithm. For example, the radio propagation directions 370 may be combined in the step 206 according to weights corresponding to the signal strength or the signal quality.

The locating technique is advantageously applied for locating a radio device 350 in an active mode operation, e.g., when the RAN 300 is continuously performing beam-based AMM and/or tracking procedures. In such procedures, best beam information (e.g., beam direction 370 and reported signal strength or quality) is collected continuously. Accurate locating results can be provided based on the existing reports and known directions, so that a signaling and processing overhead caused by the locating technique is low.

In any embodiment of the technique, a radio propagation environment of the RAN 300 may be evaluated. The locating of the radio device is selectively based on the combination of the radio propagation directions depending on a result of the evaluation. In other words, the locating step 206 may be selectively performed depending on the result of the evaluation.

The RAN 300, e.g., the serving TRP 100, may selectively perform or switch between different locating modes (e.g., different positioning algorithm) depending on the result of the evaluation. The RAN 300, e.g., the serving TRP 100, may be configured to perform different locating modes. The different locating modes may be different in the way the available beam information (e.g., the reports and/or the radio propagation directions, particularly information gathered or processed for the AMM or BM procedures) are used for locating the radio device 350. The locating step 206 may correspond to one locating mode among the different locating modes. That is, the step 206 including a location based on at least the combination of the radio propagation directions 370 may be performed in one of the different locating modes.

The locating mode may be selected depending on specifics of a deployment of the RAN 300, the radio propagation in the region covered by the RAN 300 and/or the radio propagation in a sub-region where the radio device 350 is located. The selection of the locating mode may be performed by the RAN 300, e.g., the serving TRP 100.

A method of selecting a locating mode may comprise the following steps. Optionally, the selection of the locating mode comprises a step of evaluating a radio propagation environment of the region covered by the RAN 300 or a sub-region thereof, in which the radio device 350 is located. The selection of the locating mode may comprise a step of determining a locating mode (e.g., a suitable positioning mode) based on the evaluation results. Alternatively or in addition, the selection of the locating mode may comprise a step of performing the locating of the radio device 350 according to the selected locating mode, e.g., by selectively performing the step 206.

In the evaluating step, the RAN 300 may use measurement results based on the radio beams and/or the CSI or channel characterization information to evaluate radio propagation and/or channel properties. This information may be gathered based on prior activity of other radio devices 350 in the same region of the RAN 300. More specifically, at least one of the following criteria or selection parameters may be evaluated.

A first selection parameter comprises an angle spread. The angle spread may be a measure for the extent a width of the transmitted radio beam is increased, e.g., by scattering in the propagation environment. The angle spread may be estimated by comparing the difference in signal qualities as measured and reported by the radio device 350 for adjacent radio beams, i.e., different radio beams that are transmitted from the same TRP 100 and are neighboring in terms of the radio propagation direction 370. The more adjacent radio beams have equal or similar signal qualities, the greater the angle spread is.

A second selection parameter comprises at least one of dispersiveness, reflectiveness and diffractiveness. The second selection parameter may comprise measures of scattering in the radio propagation environment. The second selection parameter may be estimated by the RAN 300 based on uplink channel characteristics derived from a sounding reference signal (SRS) or any other uplink signals, e.g., on a physical uplink control channel (PUCCH).

A third selection parameter comprises or relates to a (e.g., dominant) path loss law. The third selection parameter may be indicative of how signal strength degrades as a function of propagation distance. The path loss law may be a scaling power or an exponential decay parameter. The third selection parameter may be estimated by the RAN 300 based on the reported signal quality or signal strength in conjunction with the location for radio devices 350, e.g., for previously active radio devices 350. The location may be known or otherwise determined based on a satellite positioning system (e.g., the global positioning system, GPS).

In the step of determining the locating mode, the evaluated properties are used to determine the suitable positioning mode. Environments or situations, e.g., particular channels, with low angle spread (e.g., in LOS or near-LOS environments or situations) are suited for locating the radio device 350 by triangulation (e.g., triangulation only), i.e., the angles 504 are combined according to the step 206. In environments or situations, e.g., particular channels, with a well-defined path loss law and limited dispersion (e.g., in partial-LOS environments or situations), the combination in the step 206 may comprise both triangulation and trilateration. For example, the combination of the radio propagation directions 370 may further take into account distance estimates based on the reported signal strength and the path loss law. In environments or situations, e.g., particular channels, with less structured propagation characteristics (e.g., in non-LOS environments or situations), a conventional or RAN-independent locating technique may be applied instead of performing the step 206.

The locating modes may include at least one of the following examples. A first locating mode example comprises triangulation. The first locating mode example may be selected in a LOS or a near-LOS situation with beamforming (e.g., DFT precoding) of the radio beams transmitted from a uniform antenna array in the respective TRP 100. The geometrical directions of the preferred radio beams from each of two or more (e.g., nearby) TRPs 100 are combined in the step 206 to determine the UE location, e.g., using Euclidean geometry constructions to determine the beam crossing point or estimate the beam crossing points.

A second locating mode example comprises both triangulation and trilateration. The second locating mode example may be selected in partially-LOS situations. The radio propagation direction 370 of the preferred radio beam from each of the multiple TRPs 100 may be augmented by the reported signal strength or signal quality for the corresponding radio beam. The reported signal strength or signal quality (e.g., a reference signal quality information, or briefly: "quality") may be estimated for the respective radio beam by the radio device 350 (e.g., at the UE location). The radio propagation directions 370 (or briefly: "direction") and the reported quality may be associated based on the identity of the respective radio beam. The pair of direction and quality for the preferred radio beams is used to estimate the location of the radio device 350 in the step 206. The reported quality (e.g., signal strength) is converted into a distance metric to complement the direction.

A third locating mode example comprises at least one of locating based on signal quality and a RAN-independent locating of the radio device 350. The quality-based locating may use the preferred beam and the reported signal quality. For example, the location may be retrieved from a previously created database. The data base may map the identity of the preferred radio beam and the reported signal strength (i.e., the beam information) to the location (i.e., an estimate for the location). The database may be created by recording beam information from a large set of radio devices 350 that have been mapped to physical locations, e.g. based on GPS results. The third locating mode example may be selected in less structured environments.

In less structured environments where a mapping of the beam information to the location is not available, the RAN 300 may revert to conventional locating techniques. The conventional locating techniques may comprise the radio device 350 estimating and reporting TDOA based on a PRS, or the UE performing RA and reporting TA towards multiple (e.g., neighboring) TRPs.

Base on the evaluating step, the step of determining the locating mode is a control mechanism for determining whether to operate in one of the above modes according to the step 206, or to revert to conventional positioning modes, e.g. in highly dispersive and/or high angle spread situations where the nominal beam directions are not well maintained in the propagation environment. Thus, the method 200 is implementable with high efficiency for accurately locating the radio device 350, optionally with a fallback to conventional distance-based locating techniques.

In any embodiment, the spatial widths (or briefly widths) of the radio beams (e.g., AMM or BM beams), which are used to derive the radio propagation direction 370 or the angles 504 for the locating step 206, may also be used to estimate the accuracy of the resulting location. The narrower the transmitted radio beams, the more geometrically accurate the associated location is. The width may be defined by the angle between the half-power (i.e., −3 dB) points of the main lobe.

For further improvement of the locating accuracy or for a three-dimensional region, the reported signal strength or signal quality in both horizontal and vertical domain for each of the radio beams is used for the locating, e.g., for determining the radio propagation direction 370 of the preferred radio beam for each of the multiple TRPs or for estimating the distance. Alternatively or in addition, the radio propagation direction 370 comprises multiple angles 504 for main lobe and side lobes. Since each radio beam also has side lobs, which the radio device 350 might receive as the strongest, different angles 504 may be taken into account for the combination in the step 206. For example, each radio propagation direction 370 be implemented by a probability function of the angle. The combination in the step 206 may use joint probabilities for the multiple radio beams covering a given physical location. The physical location with the highest joint probability may be the location resulting from the step 206.

While embodiments of the technique have been described with reference to at least one of the TRPs 100, the RAN 300 and the radio device 350, the method 200 may be implemented in at least one or each of the TRPs 100 (e.g., the TRP 100 serving the radio device 350) or in a dedicated device 100 connected to the RAN 300. Moreover, the method 200 may be implemented transparently for the radio device 350.

Figure 9:
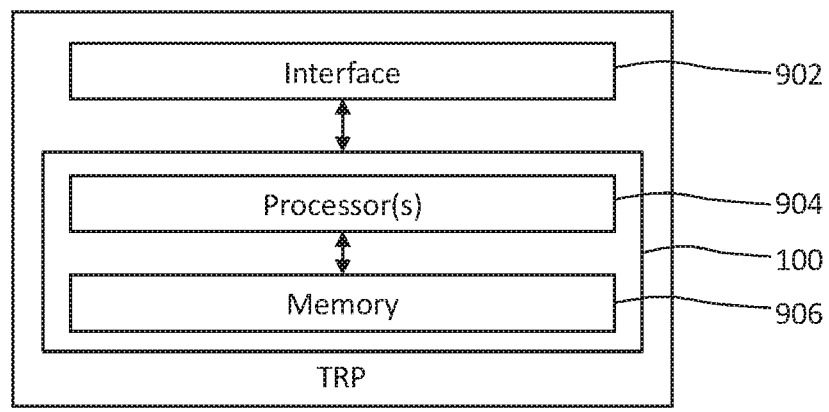
FIG. 9 shows a schematic block diagram of an embodiment of the device of FIG. 1.

FIG. 9 shows a schematic block diagram for an embodiment of the device 100. The device 100 comprises one or more processors 904 for performing the method 200 and memory 906 coupled to the processors 904. For example, the memory 906 may be encoded with instructions that implement at least one of the modules 102, 104 and 106.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, TRP functionality. For example, the one or more processors 904 may execute instructions stored in the memory 906. Such functionality may include providing various features and steps discussed herein, including any of the benefits disclosed herein. The expression "the device being operative to perform an action" may denote the device 100 being configured to perform the action.

As schematically illustrated in FIG. 9, the device 100 may be embodied by a TRP 900, e.g., functioning as a base station, micro cell or access point. The TRP 900 comprises a radio interface 902 coupled to the device 100 for radio communication with one or more radio devices and/or one or more other TRPs.

Figure 10:
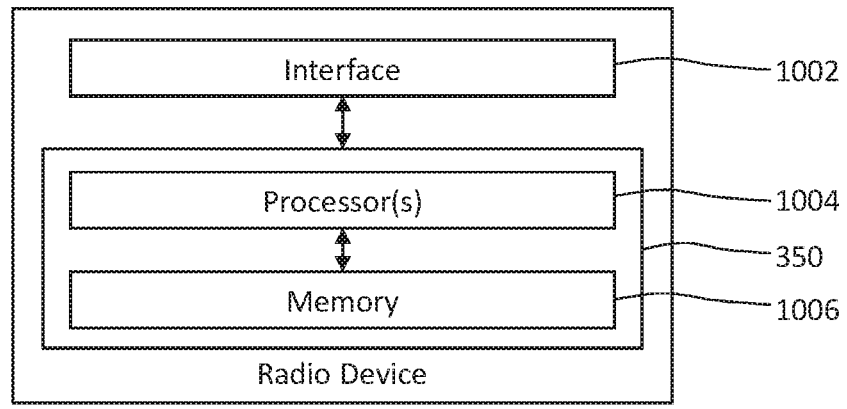
FIG. 10 shows a schematic block diagram of an embodiment of a radio device.

FIG. 10 shows a schematic block diagram for an embodiment of a radio device 350. The radio device 350 comprises one or more processors 1004 for performing measurements and transmitting measurement reports and memory 1006 coupled to the processors 1004. For example, the memory 1006 may be encoded with instructions for performing the measurements and transmitting the measurement reports.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 350, such as the memory 1006, radio device functionality. For example, the one or more processors 1004 may execute instructions stored in the memory 1006. Such functionality may include providing various features and steps discussed herein, including any of the benefits disclosed herein.

As schematically illustrated in FIG. 10, the radio device 350 may be embodied by a mobile station 1000, e.g., functioning as a user equipment, wearable device or connected vehicle. The radio device may comprise a radio interface 1002 for radio communication with one or more other radio devices and/or one or more TRPs.

Figure 11:
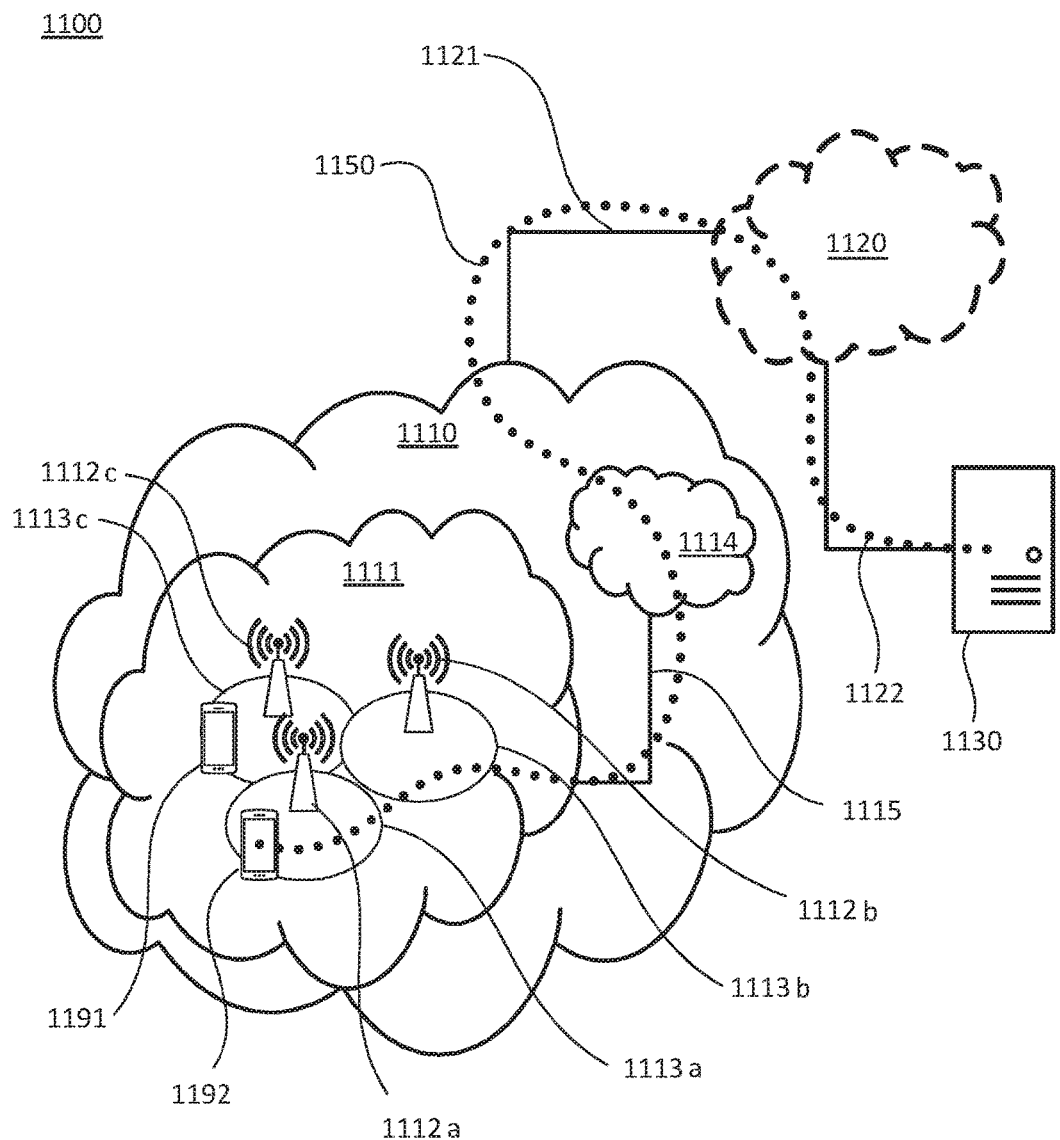
FIG. 11 schematically illustrates a telecommunication network connected via an intermediate network to a host computer.

With reference to FIG. 11, in accordance with an embodiment, a communication system 1100 includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system 1100 of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data, which is transmitted using the OTT connection 1250. The user data may depend on the location of the UE 1230 determined in the step 206. The user data may comprise auxiliary information or precision advertisements (also: ads) delivered to the UE 1230. The location may be reported by the UE 1230 to the host computer, e.g., using the OTT connection 1250, and/or by the base station 1220, e.g., using a connection 1260.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
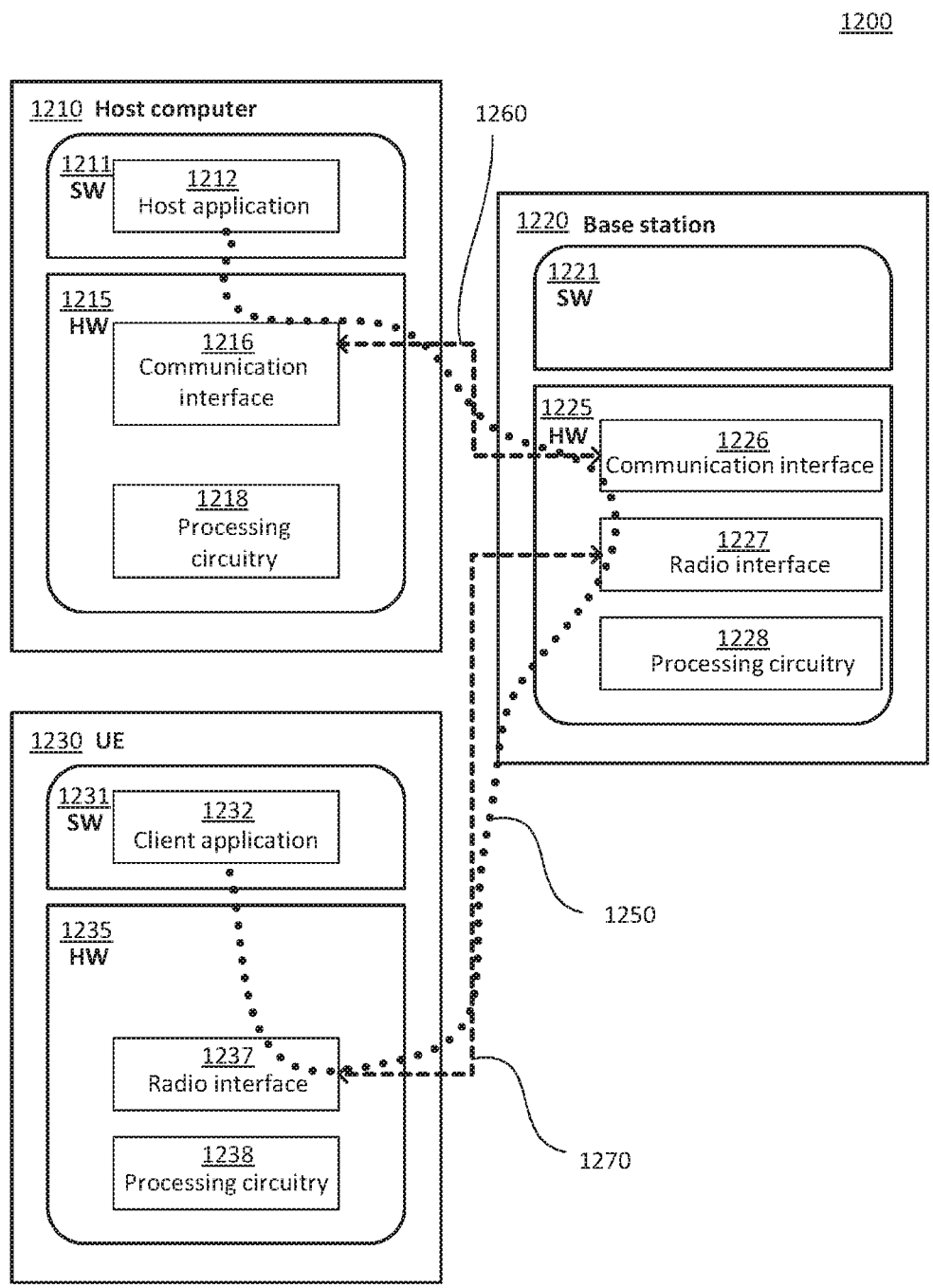
FIG. 12 shows a generalized block diagram of a host computer communicating via a base station with a user equipment over a partially wireless connection.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or "dummy" messages, using the OTT connection 1250 while it monitors propagation times, errors etc.

Figures 13, 14:
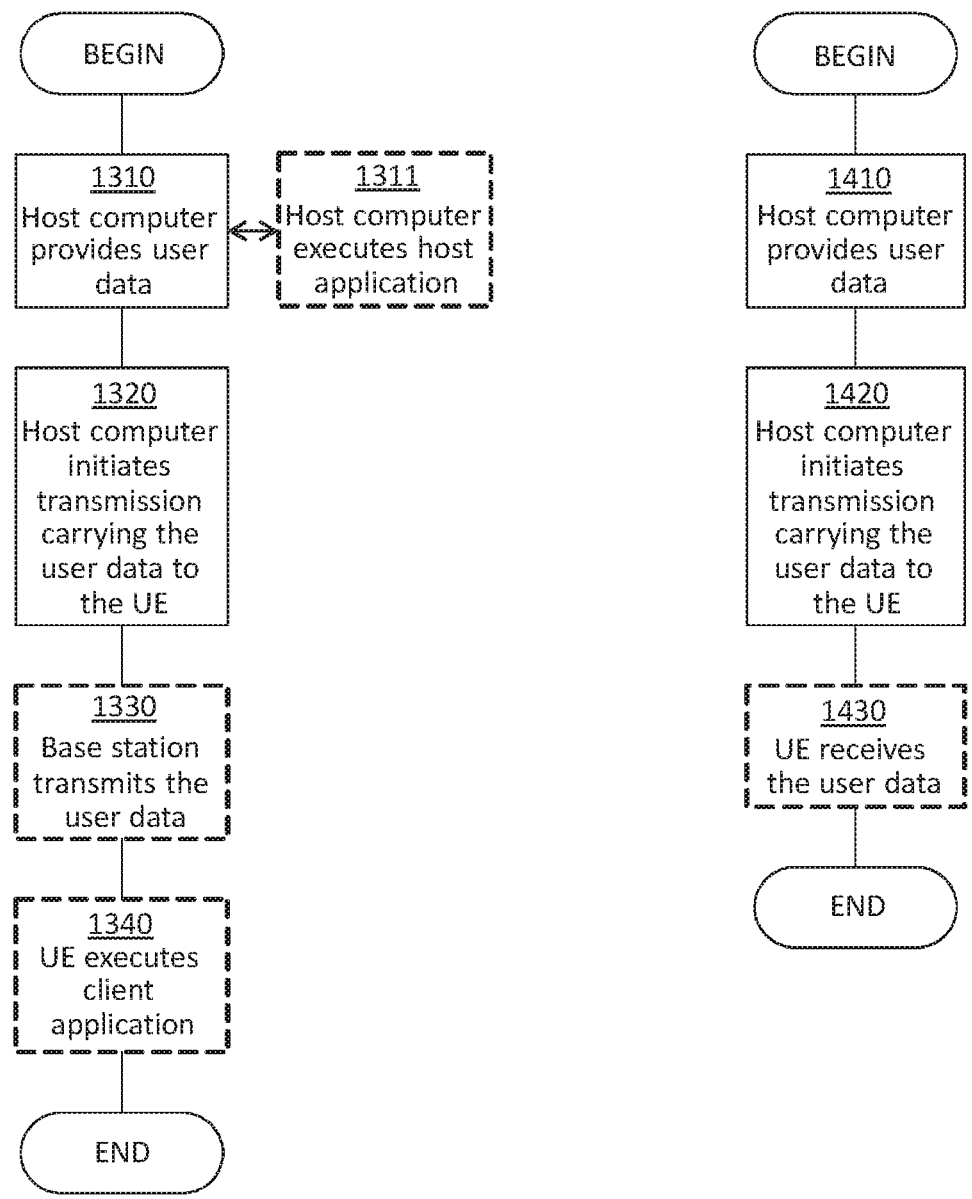
FIGS. 13 and 14 show flowcharts for methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

The technique may be implemented as a method 200 in a RAN 300 and/or 1110 for locating a radio device 350, 1191, 1192 and/or 1230. The RAN may comprise a cellular communications network. In any embodiment or implementation, the RAN may transmit (e.g., narrow) radio beams from TRPs 100, 1112a, 1112b and/or 1112c. The RAN may obtain radio propagation directions 370 for preferred radio beams between two or more of the TRPs and the radio device, e.g., based on a set of beam quality measurements reported from the radio device. The radio propagation directions may comprise any directional parameters such as angles 504, phase shifts, directional antenna gains and/or probability functions of the angle or the location.

The set of beam quality measurements may be obtained from beam mobility and/or beam management reporting. Preferably, the transmitted radio beams do not include PRSs. The radio device does not need to perform and report on PRS measurements.

The measurements may be performed and reported for beam mobility and/or beam management. The radio propagation directions for the combination may be selected based on the reports, e.g., CSI acquisition reports. The physical location of the radio device may be determined based on the radio propagation directions, e.g., of the preferred radio beam for each of the two or more TRPs. Optionally, the physical location of the radio device may be determined further based on signal quality parameters of the preferred radio beams.

The locating based on at least the radio propagation directions may depend on information obtained on RAN deployment and/or radio propagation for a relevant region of the RAN. For example, an expected accuracy of the locating according to two or more locating modes may be determined. Based on the determined accuracy, the locating mode for the step 206 may be selected or another locating technique may be performed (e.g., a conventional ToA measurement based on PRSs).

As has become apparent from above description, embodiments of the technique use direction information as opposed to UE-to-TRP distance estimates, e.g., for more precisely locating the UE as compared to a distance-based approach. Same or further embodiments require no additional signal transmissions, measurements or access procedures in the RAN or the UE to realize this advantage. At least in some embodiments, the UE does not actively participate in the locating process, e.g., beyond performing regular mobility or beam management procedures.

Same or further embodiments can, as an additional advantage, due to the geometry of straight lines as opposed to circles, e.g. in LOS scenarios, locate the UE based on only two TRPs, e.g., if narrow radio beams with weak side lobes and weak back lobe levels are used for the radio beam transmission. This may be compared to a minimum of three TRPs required in the distance-based approach. If more than two TRPs are used for the locating, this additional constraint may be used for increasing the precision of the locating.

Any embodiment may selectively apply the technique or may select different locating modes as a framework for utilizing the more efficient direction-based locating, e.g., in scenarios when the direction-based locating is feasible or superior, and for avoiding misuse in other scenarios when the direction-based locating is not superior.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of locating a radio device within a region covered by a radio access network, RAN, comprising a plurality of transmission and reception points, TRPs, the method comprising:
   receiving reports indicative of measurements performed by the radio device based on radio beams transmitted from different TRPs of the RAN, each of the radio beams corresponding to a radio propagation direction from the respective TRP; and
   locating the radio device based on a combination of the radio propagation directions corresponding to radio beams transmitted from at least two of the TRPs of the RAN; and
   each of the radio propagation directions comprising a probability of presence for the radio device as a function of location within the region, and the combination of the at least two of the radio propagation directions comprises multiplying the respective probabilities of presence for the radio device.

2. The method of claim 1, further comprising:
   determining a radio propagation direction towards the radio device for each of the at least two TRPs based on the reports, wherein the radio propagation directions combined for the locating include the determined radio propagation directions.

3. The method of claim 1, wherein the radio beams the radio propagation directions of which are combined for the locating include, for each of the at least two TRPs, the radio beam with one of a maximum signal strength and signal quality according to the reports.

4. The method of claim 1, wherein each of the radio propagation directions comprises at least one angle at the TRP transmitting the corresponding radio beam.

5. The method of claim 1, wherein the radio propagation directions are combined for the locating by one of triangulation and an estimate of triangulation.

6. The method of claim 1, wherein the measurements are beam quality measurements, and wherein the reports are beam quality measurement reports indicative of a beam quality for the radio beams transmitted from the different TRPs of the RAN.

7. The method of claim 1, wherein the measurements are performed by the radio device as part of a procedure for selecting at least one of the radio beams as a serving radio beam serving the radio device.

8. The method of claim 7, wherein two or more of the reports used for the selecting of the at least one serving radio beam are further used for the locating of the radio device.

9. The method of claim 7, wherein the at least one serving radio beam is a subset of the at least two radio beams used for the locating.

10. The method of claim 7, wherein the selecting of the at least one serving radio beam relates to at least one of beam management and mobility management.

11. The method of claim 7, wherein the selecting of the at least one serving radio beam comprises steering the at least one serving radio beam.

12. The method of claim 1, further comprising:
selecting, based on the reports, at least one of the radio beams as a serving radio beam serving the radio device.

13. The method of claim 1, wherein the region is three-dimensional and each of the radio propagation directions one of comprises and implies at least two angles.

14. The method of claim 1, wherein the radio propagation directions of the radio beams are at least one of:
controlled by means of beamforming at the respective TRP; and
derived from the beamforming at the respective TRP.

15. The method of claim 1, further comprising:
transmitting a configuration message to the radio device for performing the measurements, the configuration message being indicative of at least one of a configuration for beam management and a configuration for mobility management.

16. The method of claim 1, wherein each or at least one of the TRPs transmits radio beams corresponding to different radio propagation directions sequentially in time or simultaneously on different radio frequencies.

17. The method of claim 1, further comprising:
mapping each of the radio beams to at least one corresponding radio propagation direction.

18. The method of claim 1, wherein the radio beams transmitted from the at least two TRPs of the RAN carry at least one of reference signals and synchronization signals.

19. The method of claim 1, wherein the radio beams are precoded according to a precoding matrix, and wherein the radio propagation direction is one of derived from and associated with the precoding matrix.

20. The method of claim 1, further comprising:
evaluating a radio propagation environment of the region, wherein the locating of the radio device is selectively based on the combination of the radio propagation directions depending on a result of the evaluation.

21. The method of claim 20, wherein depending on the result of the evaluation the locating is selectively based on one of:
the combination of the radio propagation directions; and
at least one taken from the group consisting of the estimate of time-of-arrival and the estimate of signal strength for signals carried on the radio beams from the at least two TRPs of the RAN.

22. The method of claim 1, wherein the locating of the radio device is further based on at least one of an estimate of time-of-arrival and an estimate of signal strength for signals carried on the radio beams from the at least two TRPs of the RAN.

23. A non-transitory computer readable medium comprising program code portions that when executed perform a method of locating a radio device within a region covered by a radio access network, RAN, comprising a plurality of transmission and reception points, TRPs, the method comprising:
receiving reports indicative of measurements performed by the radio device based on radio beams transmitted from different TRPs of the RAN, each of the radio beams corresponding to a radio propagation direction from the respective TRP; and
locating the radio device based on a combination of the radio propagation directions corresponding to radio beams transmitted from at least two of the TRPs of the RAN;
each of the radio propagation directions comprising a probability of presence for the radio device as a function of location within the region, and the combination of the at least two of the radio propagation directions comprises multiplying the respective probabilities of presence for the radio device.

24. A device for locating a radio device within a region covered by a radio access network, RAN, comprising a plurality of transmission and reception points, TRPs, the device comprising at least one processor and a memory, said memory comprising instructions executable by said at least one processor, whereby the device is operative to:
receive reports indicative of measurements performed by the radio device based on radio beams transmitted from different TRPs of the RAN, each of the radio beams corresponding to a radio propagation direction from the respective TRP; and
locate the radio device based on a combination of the radio propagation directions corresponding to radio beams transmitted from at least two of the TRPs of the RAN;
each of the radio propagation directions comprising a probability of presence for the radio device as a function of location within the region, and the combination of the at least two of the radio propagation directions comprises multiplying the respective probabilities of presence for the radio device.

* * * * *